(12) United States Patent
Cai et al.

(10) Patent No.: US 12,512,007 B1
(45) Date of Patent: Dec. 30, 2025

(54) SYSTEMS, METHODS, AND STORAGE MEDIA FOR MULTI-MODAL SENSING AND MONITORING

(71) Applicant: BEIHANG UNIVERSITY, Beijing (CN)

(72) Inventors: Kaiquan Cai, Beijing (CN); Hongshuo Lyu, Beijing (CN); Yanbo Zhu, Beijing (CN); Liang Zhao, Beijing (CN); Peng Zhao, Beijing (CN); Zhibo Zhang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 19/235,556

(22) Filed: Jun. 11, 2025

(30) Foreign Application Priority Data

May 14, 2025 (CN) .......................... 202510622506.4

(51) Int. Cl.
| | |
|---|---|
| *G08G 7/02* | (2006.01) |
| *G01S 13/42* | (2006.01) |
| *G01S 13/58* | (2006.01) |
| *G01S 13/931* | (2020.01) |

(52) U.S. Cl.
CPC ................ *G08G 7/02* (2013.01); *G01S 13/42* (2013.01); *G01S 13/58* (2013.01); *G01S 13/931* (2013.01)

(58) Field of Classification Search
CPC ........... G08G 7/02; G01S 13/42; G01S 13/58; G01S 13/931
See application file for complete search history.

(56) References Cited

U.S. PATENT DOCUMENTS

2021/0397907 A1\* 12/2021 Derbisz ................. G06F 18/251

FOREIGN PATENT DOCUMENTS

| CN | 113888458 A | \* | 1/2022 | ........... G01S 13/931 |
| CN | 116699593 A | \* | 9/2023 | ............. G01S 13/50 |

OTHER PUBLICATIONS

Machine Translation of Liang's reference (CN-116699593-A) (Year: 2023).\*

\* cited by examiner

*Primary Examiner* — Tarek Elarabi
(74) *Attorney, Agent, or Firm* — PORUS IP LLC

(57) ABSTRACT

Disclosed are a system, a method, and a storage medium for multi-modal sensing and monitoring. The system comprises a signal emission node, a signal reception node, a mode switching module, a generation module, and a detection module. The signal emission node is configured to emit an emission signal to a target object. The signal reception node is configured to receive a reception signal reflected by the target object. The mode switching module is configured to select an operational mode for communication sensing based on a target region. The generation module is configured to generate a sensing spectrum based on the signal transmitted between the signal emission node, the signal reception node, and the target object. The detection module is configured to determine a sensing and monitoring result of the target object based on the sensing spectrum.

20 Claims, 11 Drawing Sheets

SYSTEMS, METHODS, AND STORAGE MEDIA FOR MULTI-MODAL SENSING AND MONITORING

CROSS-REFERENCE TO RELATED APPLICATIONS

This application claims priority to Chinese Patent Application No. 202510622506.4, filed on May 14, 2025, the entire contents of which are hereby incorporated by reference.

TECHNICAL FIELD

The present disclosure relates to the field of monitoring technologies, and particularly to a system, a method, and a storage medium for multi-modal sensing and monitoring.

BACKGROUND

With the rapid development of the air transport industry, the use of equipment such as radars, cameras, and sensors for safety monitoring and management of airport surfaces (e.g., tracking the movement of aircraft, vehicles, and personnel on runways and aprons) has become increasingly critical. Traditional monitoring systems, including radars, cameras, and sensors, exhibit significant limitations in monitoring accuracy, data processing speed, and real-time performance. These limitations not only compromise airport surface safety management but also restrict the efficiency and security of air transportation.

In the current technological landscape, emerging technologies such as 5G communications, artificial intelligence, and the Internet of Things (IoT) offer possibilities for higher-precision and more efficient monitoring. How to effectively integrate these technologies into the existing monitoring systems while guaranteeing real-time data transmission and processing, enhancing detection accuracy, and achieving self-adaptive operational modes constitutes a critical technical challenge to be addressed.

Furthermore, the complexity of sensing and monitoring systems for airport surfaces continues to grow. As airports expand and flight volumes increase, the volume of data requiring processing surges dramatically, imposing higher demands on data transmission and processing systems. Conventional sensing and monitoring systems often exhibit latency and errors when handling large-scale data, adversely affecting monitoring accuracy and escalating safety management risks.

Therefore, it is desirable to provide a system, a method, and a storage medium for multi-modal sensing and monitoring that can effectively improve target recognition accuracy and enable proactive prediction of anomalous events.

SUMMARY

In view of the above problems, the present disclosure provide a system, a method, and a storage medium for multi-modal sensing and monitoring. Through innovative technical approaches, the system achieves efficient and precise monitoring of airport surfaces. The system holistically addresses the entire workflow of data acquisition, transmission, processing, and application, aiming to enhance airport surface monitoring capabilities and safety via intelligent means.

One or more embodiments of the present disclosure provide a system for multi-modal sensing and monitoring. The system comprises a signal emission node, a signal reception node, a mode switching module, a generation module, and a detection module. The signal emission node includes at least one of a communication base station and a communication relay station, and is configured to emit an emission signal to a target object. The signal reception node includes at least one of the communication base station, the communication relay station, and a communication mobile station, and is configured to receive a reception signal reflected by the target object. The mode switching module is configured to select an operational mode for communication sensing based on a target region. The generation module is configured to generate a sensing spectrum based on a signal transmitted between the signal emission node, the signal reception node, and the target object. The detection module is configured to determine a sensing and monitoring result of the target object based on the sensing spectrum, wherein the sensing and monitoring result includes at least one of a location, a confidence level, and a class of the target object.

One or more embodiments of the present disclosure provide a method for multi-modal sensing and monitoring. The method comprises: determining an operational mode in which a signal emission node and a signal reception node perform communication-based sensing on a target object; obtaining at least one of an emission signal emitted from the signal emission node, a signal reception delay at the signal reception node, a Doppler frequency shift of a signal travelling round-trip between the signal emission node and the signal reception node, and a reception angle; obtaining a reception signal at the signal reception node based on at least one of the emission signal, the signal reception delay, the Doppler frequency shift, and the reception angle; obtaining a sensing spectrum based on the reception signal; and determining, based on the sensing spectrum, a sensing and monitoring result of the target object, wherein the sensing and monitoring result includes at least one of a location, a confidence level, and a class of the target object.

One or more embodiments of the present disclosure provide a non-transitory computer-readable storage medium storing computer instructions. When a computer reads the computer instructions in the storage medium, the computer executes the method for multi-modal sensing and monitoring provided in one or more embodiments of the present disclosure.

BRIEF DESCRIPTION OF THE DRAWINGS

The present disclosure will be further illustrated by way of exemplary embodiments, which are described in detail with the accompanying drawings. These embodiments are non-limiting. In these embodiments, the same number indicates the same structure, wherein.

DETAILED DESCRIPTION

Figure 1:
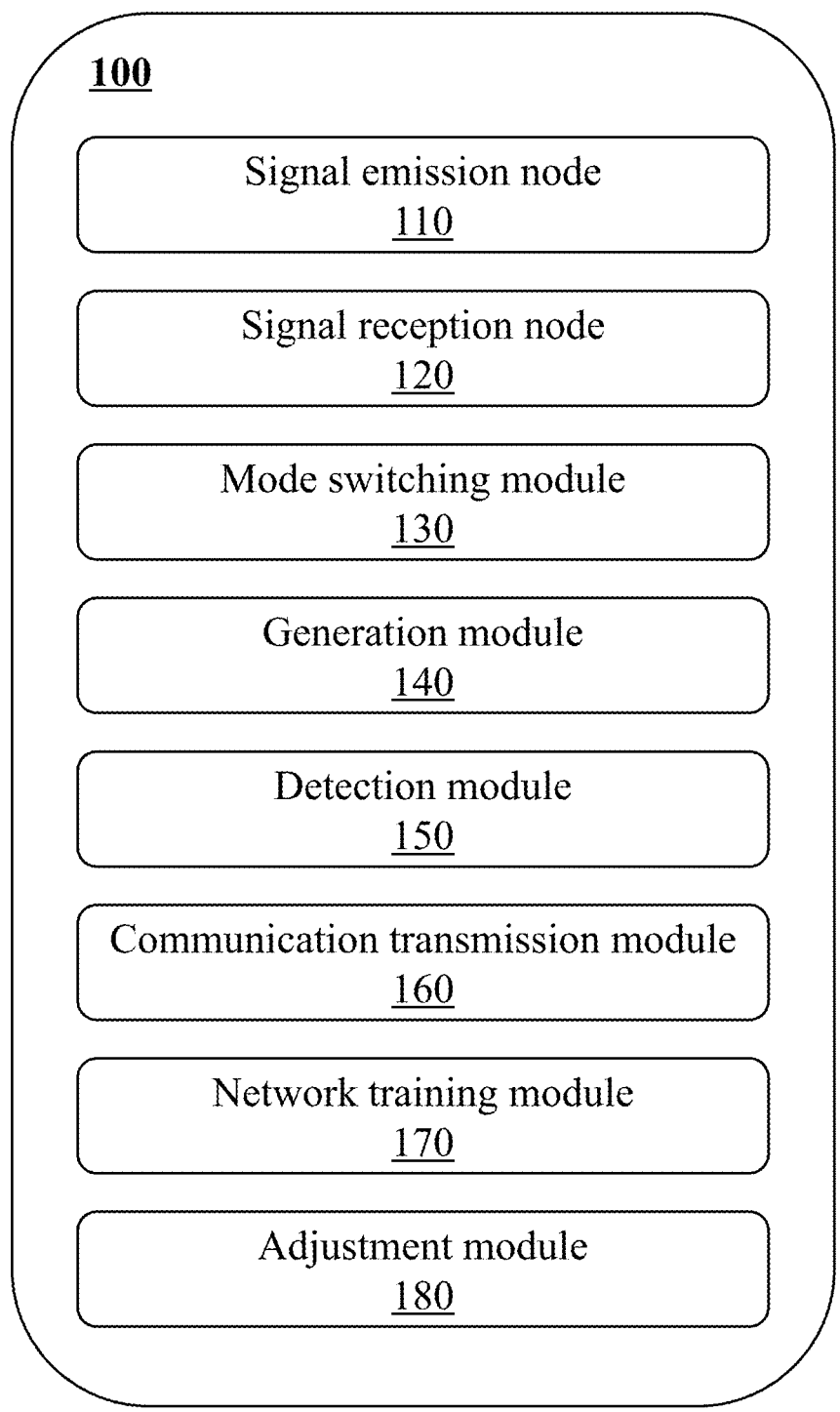
FIG. 1 is a schematic block diagram of a system for multi-modal sensing and monitoring according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor. Unless otherwise indicated or stated in the context, the same reference numerals in the drawings represent the same structures or operations.

It should be understood that the terms "system," "device," "unit," and/or "module" used herein are ways for distinguishing different levels of components, elements, parts, or assemblies. However, if other terms can achieve the same purpose, they may be used as alternatives.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operations performed by the system according to the embodiments described herein. It should be understood that the operations may not necessarily be performed in the exact sequence depicted. Instead, the operations may be performed in reverse order or concurrently. Additionally, other operations may be added to these processes, or one or more operations may be removed.

FIG. 1 is a schematic block diagram of a system for multi-modal sensing and monitoring according to some embodiments of the present disclosure. As shown in FIG. 1, a system 100 for multi-modal sensing and monitoring may include a signal emission node 110, a signal reception node 120, a mode switching module 130, a generation module 140, and a detection module 150.

In some embodiments, the signal emission node 110 is configured to emit an emission signal to a target object. The signal reception node 120 is configured to receive a reception signal reflected by the target object. The mode switching module 130 is configured to select an operational mode for communication sensing based on a target region. The generation module 140 is configured to generate a sensing spectrum based on a signal transmitted between the signal emission node, the signal reception node, and the target object. The detection module 150 is configured to determine a sensing and monitoring result of the target object based on the sensing spectrum.

In some embodiments, the signal emission node 110 may include at least one of a communication base station and a communication relay station.

The target object refers to an object that receives and reflects a signal. For example, the target object may include an aircraft, a vehicle, a human, etc.

In some embodiments, the emission signal emitted by the signal emission node and the reception signal received by the signal reception node may be aeronautical mobile airport communication system (AeroMACS) signals, which are used to provide data communication services for air traffic control, airport operation command, airline operation management and services, and on-site unit operation management.

In some embodiments, the communication base station may be a 5G AeroMACS base station. In some embodiments, the communication base station may include a 5G AeroMACS radar.

In some embodiments, the communication relay station is configured to shift a frequency of a signal sent from a site or amplify the signal, and then forward the signal to other sites. In some embodiments, the communication relay station may be a 5G AeroMACS relay station.

In some embodiments, antennas are provided in the communication base station and the communication relay station, and the antennas are configured to receive signals.

In some embodiments, the signal reception node 120 may include at least one of the communication base station, the communication relay station, and a communication mobile station.

The communication mobile station is configured to support signal transmission in mobile scenarios. In some embodiments, the communication mobile station may be a 5G AeroMACS mobile station.

In some embodiments, the communication mobile station may include a vehicle. For example, the communication mobile station may be an airport ground support vehicle (e.g., an aircraft towing vehicle, a water truck, a platform vehicle, a refueling truck, a ground power unit vehicle, etc.), an airfield support vehicle (e.g., a snowplow, a ground roller, a sweeping vehicle, a bird dispersal vehicle, a rubber removal vehicle, a forklift, a friction coefficient testing vehicle, etc.), or the like.

In some embodiments, the mode switching module 130 is configured to select an operational mode for communication sensing based on a target region. In some embodiments, the mode switching module may be configured on a terminal processor.

The target region refers to a designated region for receiving signals. For example, the target region may include an airport ground surface (e.g., a runway, an apron, a vehicle lane, etc.).

In some embodiments, the operational mode for communication sensing between the signal emission node and the signal reception node includes at least one of a communication base station sensing mode, a communication relay station sensing mode and a communication mobile station sensing mode.

Figure 2:
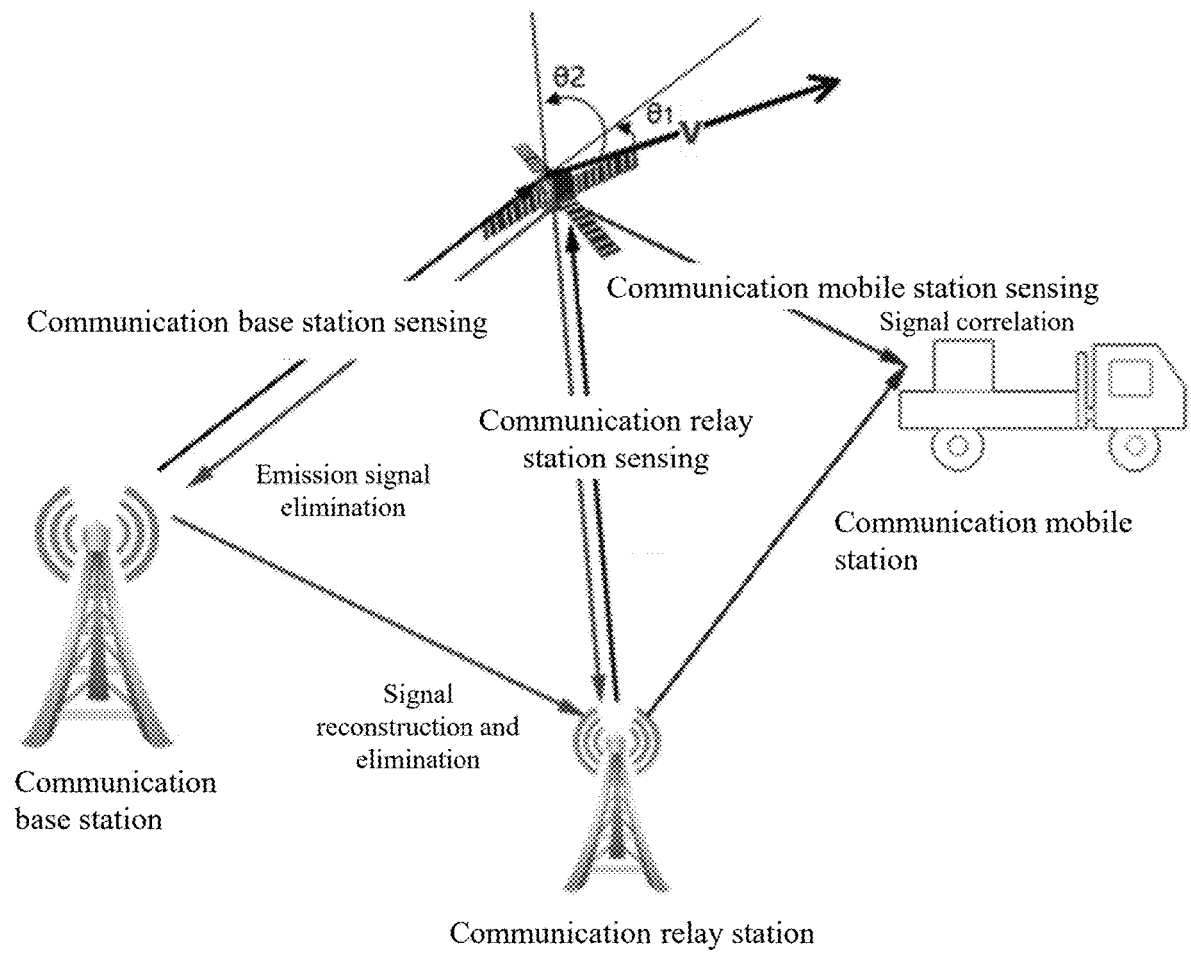
FIG. 2 is a schematic diagram of an operational mode of a system for multi-modal sensing and monitoring according to some embodiments of the present disclosure.

In some embodiments, as shown in FIG. 2, in the communication base station sensing mode, the communication base station functions as the signal emission node and the signal reception node. In the communication relay sensing mode, the communication base station functions as the signal emission node and the communication relay station functions as the signal reception node. In the communication mobile station sensing mode, the communication base station or the communication relay station functions as the signal emission node, and the communication mobile station functions as the signal reception node.

In some embodiments, in the communication base station sensing mode, the communication base station functions as the signal emission node and the signal reception node. In the communication base station sensing mode, the communication base station transmits a signal and receives a reception signal reflected by the target object. Since the signal emission node and the signal reception node are located at a same node, the signal reception node is able to obtain complete information about a transmitted waveform.

In some embodiments, in the communication relay station sensing mode, the communication base station functions as the signal emission node, and the communication relay station functions as the signal reception node. In the communication relay station sensing mode, the signal emission node and the signal reception node are separate devices. The signal reception node receives the signal emitted by the signal emission node, and after demodulation, decoding, and reconstruction, the signal is used for sensing a spatial region to be monitored.

In some embodiments, in the communication mobile station sensing mode, the communication base station or the communication relay station functions as the signal emission node, and the communication mobile station functions as the signal reception node. In the communication mobile station sensing mode, the signal emission node and the signal reception node are separate devices. The signal reception node is equipped with two channels: a reference channel and a monitoring channel. The sensing of the spatial region is achieved by comparing a signal correlation between the reference channel and the monitoring channel.

The three modes, through different node combinations and signal processing mechanisms, realize multi-modal collaboration for airport surface monitoring, enabling fine monitoring of fixed regions, wide-area coverage, and dynamic scenario adaptation, thereby comprehensively addresses monitoring requirements for all scenarios including runways, aprons, and vehicle transit lanes.

In some embodiments, the generation module 140 may be configured to generate a sensing spectrum based on the signal transmitted between the signal emission node, the signal reception node, and the target object.

The sensing spectrum refers to a dynamically updated spectrum composed of signal data. More descriptions regarding the sensing spectrum may be found in FIG. 5 and its related descriptions.

In some embodiments, the detection module 150 may be configured to determine a sensing and monitoring result of the target object based on the sensing spectrum.

The sensing and monitoring result refers to data related to the detected target object. In some embodiments, the sensing and monitoring result may include at least one of a location, a confidence level, and a class of the target object.

In some embodiments, the location of the target object refers to a physical coordinate of the target object. In some embodiments, the location may be expressed as a range and an angle of the target object relative to a reference point, such as the signal emission node or the signal reception node.

The confidence level refers to a detection accuracy of the target object. In some embodiments, the confidence level may be represented by a value ranging from 0 to 1, and the closer the value is to 1, the higher the detection accuracy is.

In some embodiments, the class of the target object may include an aircraft class, a vehicle class, a human class, or the like. For example, a parameter [1, 0, 0] represents the aircraft class, a parameter [0, 1, 0] represents the vehicle class, and a parameter [0, 0, 1] represents the human class.

In some embodiments, the detection module 150 may also be configured to determine a three-dimensional (3D) detection bounding box of the target object by performing information fusion on the sensing spectrum based on a first detection model; determine a second detection model based on the 3D detection bounding box and a ground truth bounding box of the target object; and determine the sensing and monitoring result based on the second detection model.

Figure 5:
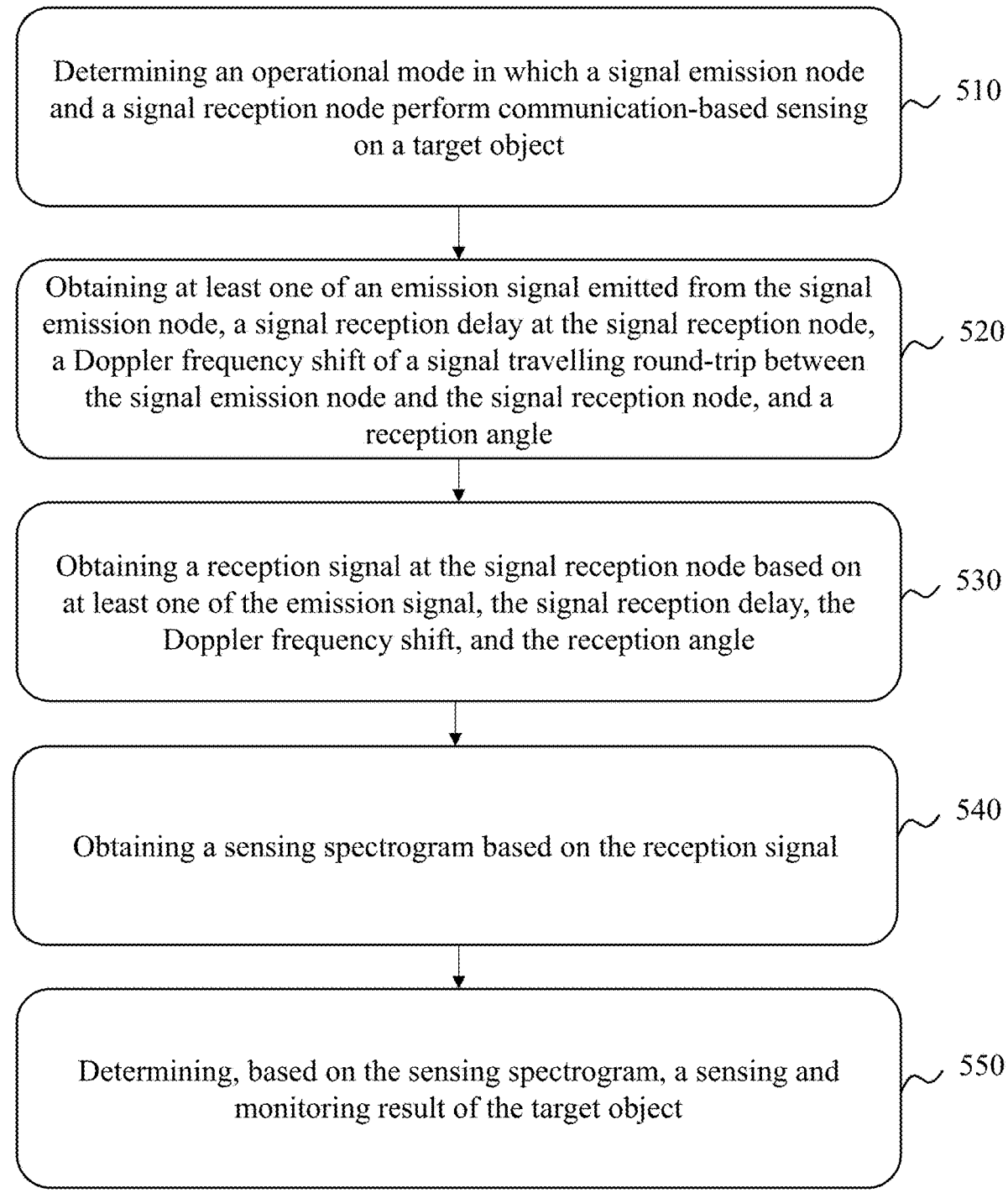
FIG. 5 is a flowchart of an exemplary process of a method for multi-modal sensing and monitoring according to some embodiments of the present disclosure.

More descriptions of this embodiment may be found in FIG. 5 and the related descriptions thereof.

In some embodiments, the system 100 may further include a communication transmission module 160. The communication transmission module 160 is configured to transmit the sensing spectrum acquired at at least one of the communication relay station and the communication mobile station to the communication base station.

In some embodiments, the system 100 may further include a network training module 170. The network training module 170 is configured to construct the first detection model including a fusion detection network, a spatial channel attentional module, a shared multilayer perceptron, a spatial attention module, a generative spatial attention map, and an attention mechanism module. More descriptions this embodiment may be found in FIG. 5 and the related descriptions thereof.

In some embodiments, the network training module may also be configured to obtain the second detection model based on the 3D detection bounding box and the ground truth bounding box of the target object. More descriptions this embodiment may be found in FIG. 5 and the related descriptions thereof.

In some embodiments, the system 100 may further include an adjustment module 180. The adjustment module 180 is configured to, at each of a plurality of target time points: determine a confidence drop value corresponding to the target time point based on an average confidence level corresponding to the target time point and an average confidence level corresponding to a previous target time point; in response to the confidence drop value at the target time point being greater than a preset threshold, update a signal emission parameter and a signal reception parameter at the target time point, generate a signal emission instruction and a signal reception instruction based on an updated signal emission parameter and an updated signal reception parameter, and send the signal emission instruction and the signal reception instruction to the signal emission node and the signal reception node, respectively; and generate a target location at the target time point, and generate a movement instruction based on the target location. More descriptions of this embodiment may be found in FIG. 5 and the related descriptions thereof.

In some embodiments, the adjustment module 180 may be further configured to, at each of a plurality of target time points, in response to real-time traffic corresponding to the target time point satisfying a preset condition, update the signal emission parameter and the signal reception parameter at the target time point based on the real-time traffic and an environmental parameter, and generate the movement instruction to control a movement of the communication mobile station. More descriptions of this embodiment may be found in FIG. 5 and the related descriptions thereof.

In some embodiments, the adjustment module 180 may be further configured to, at each of the plurality of target time points, determine an anti-jamming capability of a current operational mode through an anti-jamming prediction model based on a meteorological condition and a signal noise level, the anti-jamming prediction model being a machine learning model; and in response to the anti-jamming capability of the current operational mode being below an anti-jamming threshold, determine an updated operational mode, an updated signal emission parameter, an updated signal reception parameter, and an updated movement instruction through an adjustment model. More descriptions of this embodiment may be found in FIG. 5 and the related descriptions thereof.

It should be noted that the above descriptions of the system for multi-modal sensing and monitoring and the modules thereof are provided for illustrative purposes only and do not limit the scope of the present disclosure to the exemplary embodiments. It is understood that, for those skilled in the art, various modules may be arbitrarily combined or form subsystems connected with other modules without departing from the underlying principles of the system. In some embodiments, the signal emission node, the signal reception node, the mode switching module, the generation module, and the detection module disclosed in FIG. 1 may be different modules within a single system or a single module may perform the functions of two or more of the aforementioned modules. For example, the various modules may share a storage module or may each have their own storage module. Such variations are all within the scope of protection of the present disclosure.

FIG. 5 is a flowchart of an exemplary process of a method for multi-modal sensing and monitoring according to some embodiments of the present disclosure. The method may be performed by the multi-modal perception monitoring system 100. As shown in FIG. 5, process 500 includes the following operations.

In 510, determining an operational mode in which a signal emission node and a signal reception node perform communication-based sensing on a target object.

In some embodiments, the mode switching module 130 may determine the operational mode in which the signal emission node and the signal reception node perform communication-based sensing on the target object based on a target region. For example, the target region may be an airport surface, and the mode switching module 130 may select a suitable operational mode based on requirements of the airport surface. The requirements may include a coverage range, a detection target, equipment deployment, or the like.

In some embodiments, the signal emission node includes at least one of a communication base station and a communication relay station, and the signal reception node includes at least one of the communication base station, the communication relay station, and a communication mobile station. The operational mode includes at least one of a communication base station sensing mode, a communication relay station sensing mode, and a communication mobile station sensing mode.

More descriptions regarding the signal emission node, the signal reception node, the operational mode, the communication base sensing station, the communication relay station sensing mode, and the communication mobile station sensing mode may be found in FIG. 1 and the related descriptions thereof.

In 520, obtaining at least one of an emission signal emitted from the signal emission node, a signal reception delay at the signal reception node, a Doppler frequency shift of a signal travelling round-trip between the signal emission node, and the signal reception node, and a reception angle.

The reception angle refers to an angle of the target object relative to the communication base station, the communication relay station, or the communication mobile station.

The Doppler frequency shift refers to a frequency offset observed at a receiving end due to the relative motion between the signal emission node and the signal reception node, wherein a frequency of the reception signal differs from a frequency of the emission signal.

In some embodiments, the system 100 may acquire at least one of the emission signal emitted from the signal emission node, the signal reception delay at the signal reception node, the Doppler frequency shift of the signal travelling round-trip between the signal emission node, and the signal reception node, and the reception angle in various ways.

In some embodiments, in the communication base station sensing mode, the signal reception delay at the signal reception node is related to a time for the signal emission node to propagate the signal to the target object. The time for the signal emission node to propagate the signal to the target object is related to a range between the signal emission node and the target object and a speed of light. For example, the signal reception delay at the signal reception node is positively correlated with the time for the signal emission node to propagate the signal to the target object. The time for the signal emission node to propagate the signal to the target object is positively correlated with the range between the signal emission node and the target object and negatively correlated with the speed of light.

In some embodiments, in the communication base station sensing mode, the Doppler frequency shift of the signal travelling round-trip between the signal emission node is related to a Doppler frequency shift of the signal from the signal emission node to the target object. The Doppler frequency shift of the signal from the signal emission node to the target object is related to an angle between a motion direction of the target object and a signal emission direction of the signal emission node, a carrier frequency, a velocity of the target object relative to the communication base station, and the speed of light. For example, the Doppler frequency shift of the signal travelling round-trip between the signal emission node is positively correlated with the Doppler frequency shift of the signal from the signal emission node to the target object. The Doppler frequency shift of the signal from the signal emission node to the target object is positively correlated with the angle between the motion direction of the target object and the signal emission direction of the signal emission node, the carrier frequency, and the velocity of the target object relative to the communication base station, and negatively correlated with the speed of light.

In some embodiments, in the communication base station sensing mode, the signal reception delay at the signal reception node and the Doppler frequency shift of the signal travelling round-trip between the signal emission node may be represented by equations including:

$$\tau_{k,basestation} = 2\tau_{1,k,basestation},$$

$$f_{d,k,basestation} = 2f_{d,1,k,basestation},$$

$$\tau_{1,k,basestation} = \frac{R_{1,k,basestation}}{c},$$

$$f_{d,1,k,basestation} = -\frac{f_c v_{k,basestation} \cos(\theta_{1,k,basestation})}{c},$$

wherein $\tau_{k,basestation}$ denotes a signal reception delay at the signal reception node for a signal reflected by the k-th target object, where k=1, 2, . . . , K, and K denotes a total count of target objects; $\tau_{1,k,basestation}$ represents a time for the signal emission node to propagate the signal to the k-th target object; $f_{d,k,basestation}$ represents a Doppler frequency shift of the signal that is reflected the k-th target object and travels round-trip between the signal emission node and the signal reception node; $f_{d,1,k,basestation}$ represents a Doppler frequency shift of the signal from the signal emission node to the k-th target object; $R_{1,k,basestation}$ represents a range from the signal emission node to the k-th target object; c represents the speed of light; $\theta_{1,k,basestation}$ represents an angle between a motion direction of the k-th target object and a signal emission direction of the signal emission node; $f_c$ represents the carrier frequency; $v_{k,basestation}$ represents a velocity of the k-th target object relative to the communication base station. In the communication base station sensing mode, the reception angle is an angle of a location of the target object relative to the communication base station.

In some embodiments, in the communication relay sensing mode, the signal reception delay at the signal reception node is related to the time for the signal emission node to propagate the signal to the target object and a time for the target object to propagate the signal to the signal reception node. The time for the signal emission node to propagate the signal to the target object is related to the range between the signal emission node and the target object and the speed of light. The time for the target object to propagate the signal to the signal reception node is related to a range between the target object and the signal reception node and the speed of light. For example, the signal reception delay at the signal reception node is positively correlated with the time for the signal emission node to propagate the signal to the target object and the time for the target object to propagate the signal to the signal reception node. The time for the signal emission node to propagate the signal to the target object is positively correlated with the range between the signal emission node and the target object and negatively correlated with the speed of light. The time for the target object to propagate the signal to the signal reception node is positively correlated with the range between the target object and the signal reception node and negatively correlated with the speed of light.

In some embodiments, in the communication relay sensing mode, the Doppler frequency shift of the signal travelling round-trip between the signal emission node and the signal reception node is correlated with the Doppler frequency shift of the signal from the signal emission node to the target object and a Doppler frequency shift of the signal from the target object to the signal reception node. The Doppler frequency shift from the signal emission node to the target object is related to the angle between the motion direction of the target object and the signal emission direction of signal from the signal emission node, the carrier frequency, a velocity of the target object relative to the communication relay station, and the speed of light. The Doppler frequency shift from the target object to the signal reception node is related to an angle between the motion direction of the target object and a signal reception direction of the signal reception node, the carrier frequency, the velocity of the target object relative to the communication relay station, and the speed of light. For example, the Doppler frequency shift of the signal travelling round-trip between the signal emission node and the signal reception node is positively correlated with the Doppler frequency shift of the signal from the signal emission node to the target object and the Doppler frequency shift of the signal from the target object to the signal reception node. The Doppler frequency shift from the signal emission node to the target object is positively correlated with the angle between the motion direction of the target object and the signal emission direction of the signal emission node, the carrier frequency, and the velocity of the target object relative to the communication relay station, and negatively correlated with the speed of light. The Doppler frequency shift from the target object to the signal reception node is positively correlated with the angle between the motion direction of the target object and the signal reception direction of the signal reception node, the carrier frequency, and the velocity of the target object relative to the communication relay station, and negatively correlated with the speed of light.

In some embodiments, in the communication relay station sensing mode, the signal reception delay at the signal reception node and the Doppler frequency shift of the signal travelling round-trip between the signal emission node and the signal reception node may be represent by equations including:

$$\tau_{k,relaystation} = \tau_{1,k,krelaystation} + \tau_{2,k,relaystation},$$

$$f_{d,k,relaystation} = f_{d,1,k,relaystation} + f_{d,2,k,relaystation},$$

$$\tau_{1,k,relaystation} = \frac{R_{1,k,relaystation}}{c};$$

$$\tau_2 = \frac{R_{2,k,relaystation}}{c},$$

$$f_{d,1,k,relaystation} = -\frac{f_c v_{k,\text{relaystation}} \cos(\theta_{1,k,relaystation})}{c},$$

$$f_{d,2} = -\frac{f_c v_{k,relaystation} \cos(\theta_{2,k,relaystation})}{c},$$

wherein $\tau_{k,relaystation}$ a signal reception delay at the signal reception node for a signal reflected by the k-th target object; $\tau_{1,k,relaystation}$ represents a time for the signal emission node to propagate the signal to the k-th target object; $\tau_{2,k,relaystation}$ represents the time for the k-th target object to propagate the signal to the signal reception node; $f_{d,k,relaystation}$ represents a Doppler frequency shift of the signal that is reflected the k-th target object and travels round-trip between the signal emission node and the signal reception node; $f_{d,1,k,relaystation}$ represents a Doppler frequency shift of the signal from the signal emission node to the k-th target object; $f_{d,2,k,relaystation}$ represents a Doppler frequency shift of the signal from the k-th target object to the signal reception node; $R_{1,k,relaystation}$ represents a range from the signal emission node to the k-th target object; $R_{2,k,relaystation}$ represents a range from the signal reception node to the k-th target object; c represents the speed of light; $\theta_{1,k,relaystation}$ represents an angle between the motion direction of the k-th target object and the signal emission direction of the signal emission node; $\theta_{2,k,relaystation}$ represents an angle between the motion direction of the k-th target object and the reception signal direction of the signal reception node; $f_c$ represents the carrier frequency; $v_{k,relaystation}$ represents a velocity of the k-th target object relative to the communication relay station. In the communication relay sensing mode, the reception angle is an angle of the location of the target object relative to the communication relay station.

In some embodiments, in the communication mobile station sensing mode, the signal reception delay at the signal reception node is related to the time for the signal emission node to propagate the signal to the target object and the time for the target object to propagate the signal to the signal reception node. The time for the signal emission node to propagate the signal to the target object is related to the range between the emission node and the target object and the speed of light, and the time for the target object to propagate the signal to the reception node is related to the range between the reception node and the target object and the speed of light. For example, the signal reception delay at the signal reception node is positively correlated with the time for the signal emission node to propagate the signal to the target object and the time for the target object to propagate the signal to the signal reception node. The time for the signal emission node to propagate the signal to the target object is positively correlated with the range from the emission node to the target object and negatively correlated with the speed of light. The time for the target object to propagate the signal to the signal reception node is positively correlated with the range from the reception node to the target object and negatively correlated with the speed of light.

In some embodiments, in the communication mobile station sensing mode, the Doppler frequency shift of the signal traveling round-trip between the signal emission node and the signal reception node is related to the Doppler frequency shift of the signal from the signal emission node to the target object and the Doppler frequency shift of the signal from the target object to the signal reception node. The Doppler frequency shift from the signal emission node to the target object is related to the angle between the motion direction of the target object and the signal emission direction of the signal emission node, the carrier frequency, a velocity of the target object relative to the communication mobile station, and the speed of light. The Doppler frequency shift of the signal from the target object to the signal reception node is related to the angle between the motion direction of the target object and the signal reception direction of the signal reception node, the carrier frequency, the velocity of the target object relative to the communication mobile station, and the speed of light. For example, the Doppler frequency shift of the signal traveling round-trip between the signal emission node and the signal reception node is positively correlated with the Doppler frequency shift from the signal emission node to the target object and the Doppler frequency shift from the target object to the signal reception node. The Doppler frequency shift from the signal emission node to the target object is positively correlated with the angle between the motion direction of the target object and the signal transmitting direction of the signal emission node, the carrier frequency, the velocity of the target object relative to the communication mobile station, and is negatively correlated with the speed of light. The Doppler frequency shift from the target object to the signal reception node is positively correlated with the angle between the motion direction of the target object and the signal reception direction of the signal reception node, the carrier frequency, and the velocity of the target object relative to the communication mobile station, and is negatively correlated with the speed of light.

In some embodiments, in the communication mobile station sensing mode, the signal reception delay at the signal reception node and the Doppler frequency shift of the signal traveling round-trip between the signal emission node and the signal reception node may be represented by equations including:

$$\tau_{k,movestation} = \tau_{1,k,movestation} + \tau_{2,k,movestation},$$

$$f_{d,k,movestation} = f_{d,1,k,movestation} + f_{d,2,k,movestation},$$

$$\tau_{1,k,movestation} = \frac{R_{1,k,movestation}}{c},$$

$$\tau_{2,movestation} = \frac{R_{2,k,movestation}}{c},$$

wherein $\tau_{k,movestation}$ represents a signal reception delay at the signal reception node for a signal reflected by the k-th target object; $\tau_{1,k,movestation}$ represents a time for the signal emission node to propagate the signal to the k-th target object; $\tau_{2,k,movestation}$ represents a time for the k-th target object to propagate the signal to the signal reception node; $f_{d,k,movestation}$ represents a Doppler frequency shift of the the signal that is reflected the k-th target object and travels round-trip between the signal emission node and the signal reception node; $f_{d,1,k,movestation}$ represents a Doppler frequency shift of the signal from the signal emission node to the k-th target object; $f_{d,2,k,movestation}$ represents a Doppler frequency shift of the signal from the k-th target object to the signal reception node; $R_{1,k,movestation}$ represents a range from the signal emission node to the k-th target object; $R_{2,k,movestation}$ represents a range from the signal reception node to the k-th target object; c represents the speed of light; $\theta_{1,k,movestation}$ represents an angle between the motion direction of the k-th target object and the reception signal direction of the signal reception node; $f_c$ represents the carrier frequency; $v_{k,movestation}$ represents a velocity of the k-th target object relative to the communication mobile station. In the communication mobile station sensing mode, the reception angle is an angle of the location of the target object relative to the communication mobile station.

In some embodiments, the system 100 may obtain the emission signal emitted from the signal emission node based on the operational mode of communication-based sensing.

In some embodiments, the emission signal from the signal emission node may be obtained based on the operational mode of communication-based sensing, and may be represented by an equation including:

$$x(t) = \sum_{\mu=0}^{N_{sym}-1} \sum_{n=0}^{N_c-1} a(\mu N_c + n) \exp\left(j2\pi f_n \text{t\_rect}\left(\frac{t - \mu T_{OFDM}}{T_{OFDM}}\right)\right),$$

wherein x(t) represents an emission signal emitted from the signal emission node at a time point t; $N_{sym}$ denotes a count of symbols in the emission signal; μ represents a μ-th symbol of the emission signal; a(.) represents modulated communication data; j denotes an imaginary unit; π denotes the mathematical constant pi; $T_{OFDM}$ denotes a symbol duration of an orthogonal frequency division multiplexing (OFDM) symbol in a communication signal; $f_n$ denotes a frequency of an n-th subcarrier signal; $N_c$ denotes a total count of subcarrier signals; exp(.) denotes exponential computation; and rect(.) denotes a rectangular time window function.

In 530, obtaining a reception signal at the signal reception node based on at least one of the emission signal, the signal reception delay, the Doppler frequency shift, and the reception angle.

In some embodiments, a range between an antenna at the signal reception node and the target object is related to the speed of light and the signal reception delay at the signal reception node. For example, in the communication base station sensing mode, $R_k=c\tau_{k,basestation}$; in the communication relay station sensing mode, $R_k=c\tau_{k,movestation}$; in the communication mobile station sensing mode, $R_k=c\tau_{k,movestation}$; where $R_k$ represents the range between the antenna at the signal reception node and the k-th target object.

In some embodiments, in the communication base station sensing mode, $$y_k(t) = x(t) \cdot \exp\left(-j2\pi\Delta f \frac{2R_k}{c}\right) \cdot \exp\left(j2\pi T_{OFDM} \frac{2v_k f_c}{c}\right),$$

in the communication mobile station sensing mode, $$v_k = \frac{f_{d,k,relaystation}\lambda}{2};$$

in the communication mobile station sensing mode, $$v_k = \frac{f_{d,k,movestation}\lambda}{2};$$

where $\Delta$ denotes a wavelength of the signal, and $v_k$ denotes the velocity of the k-th target object.

In some embodiments, a plurality of antennas are provided at the communication base station, the communication relay station, and the communication mobile station.

In some embodiments, for an antenna on the signal reception node, the reception signal at the single antenna is related to a range between the antenna and the target object, the velocity of the target object, a subcarrier spacing, and the speed of light. For example, the reception signal of the single antenna is positively correlated with the range between the antenna and the target object, the velocity of the target object, and the subcarrier spacing, and is negatively correlated with the speed of light. For example, the reception signal $y_k(t)$ at the antenna may be represented by an equation including:

$$y_k(t) = x(t) \cdot \exp\left(-j2\pi\Delta f \frac{2R_k}{c}\right) \cdot \exp\left(j2\pi T_{OFDM} \frac{2v_k f_c}{c}\right),$$

wherein $y_k(t)$ represents a reception signal from the k-th target object at the antenna at the time point t; $R_k$ represents a range between the antenna of the signal reception node and the k-th target object; $v_k$ represents the velocity of the kth target object; and $\Delta f$ represents the subcarrier spacing.

In some embodiments, for the signal reception node provided with a plurality of antennas, the reception signal at each of the plurality of antennas are related to the reception signal at the antenna and an angular direction of the target object relative to the reception node. For example, the reception signals at the plurality of antennas are positively correlated with the reception signal at each of the antennas and the angular direction of the target object relative to the reception node. For example, the reception signals of the plurality of antennas may be represented by an equation including:

$$y(t) = \sum_{k=1}^{K} a(\theta_k) y_k(t),$$

wherein y(t) represents a signal received by a multi-antenna array of the signal reception node at the time point t; $a(\theta_k)$ represents a steering vector of the multi-antenna array; $y_k(t)$ represents a reception signal from the k-th target object at the antenna at the time point t; $\theta_k$ represents an angular direction of the k-th target object relative to the reception node; k=1, 2, ..., K, and K denotes the total count of target objects.

In some embodiments, the steering vector a (ek) of the multi-antenna array is expressed by:

$$a(\theta_k) \triangleq \left[1, e^{-j2\pi f_c \frac{d\sin(\theta_k)}{c}}, e^{-j2\pi f_c \frac{d\sin(\theta_k)}{c}}, \ldots, e^{-j2\pi f_c \frac{(M-1)d\sin(\theta_k)}{c}}\right],$$

wherein e is the Euler's number; d denotes a spacing between adjacent antennas in the multi-antenna array; M denotes a total count of antennas in the multi-antenna array.

In some embodiments, the reception signal $y_k(t)$ at each of the antennas is sampled to obtain a reception signal matrix $D_{Rx}$ at the time point t. The reception signal matrix $D_{Rx}$ at the time point t is composed of the reception signal of the n-th subcarrier signal in the μ-th symbol at the signal reception node.

In some embodiments, the reception signal of the n-th subcarrier signal in the μ-th symbol at the signal reception node may be expressed by:

$$(D_{Rx})_{\mu,n} = A(\mu, n)(D_{Tx})_{\mu,n} \sum_{k=1}^{K} \left(\overrightarrow{\omega_R(k)} \otimes \overrightarrow{\omega_D(k)}\right)_{\mu,n},$$

$$\overrightarrow{\omega_R(k)} = \left(0, \exp\left(-j2\pi\Delta f \frac{2R_k}{c}\right), \ldots, \exp\left(-j2\pi(N_c-1)\Delta f \frac{2R_k}{c}\right)\right),$$

$$\overrightarrow{\omega_D(k)} = \left(0, \exp\left(j2\pi T_{OFDM} \frac{2v_k f_c}{c}\right), \ldots, \exp\left(j2\pi(N_{sym}-1)T_{OFDM} \frac{2v_k f_c}{c}\right)\right),$$

wherein $(D_{Rx})_{\mu,n}$ represents the reception signal of the n-th subcarrier signal in the μ-th symbol at the signal reception node; $(D_{Tx})_{\mu,n}$ represents an emission signal of the n-th subcarrier signal in the μ-th symbol at the signal reception node; A(μ, n) represents a complex amplitude of a reception signal on the n-th subcarrier of the μ-th symbol at the signal reception node; $\overrightarrow{\omega_R(k)}$ represents a range-domain steering vector between the signal reception node and the k-th target object; $\overrightarrow{\omega_D(k)}$ represents a Doppler-domain steering vector of the k-th target object.

In 540, obtain a sensing spectrum based on the reception signal.

The sensing spectrum is a multidimensional feature map based on communication signals, used to characterize range, velocity, and angle information of the target object. In some embodiments, the sensing spectrum converts received reception signals into quantifiable three-dimensional (3D) spatial data through Fourier transforms and multi-antenna array analysis.

Figure 3:
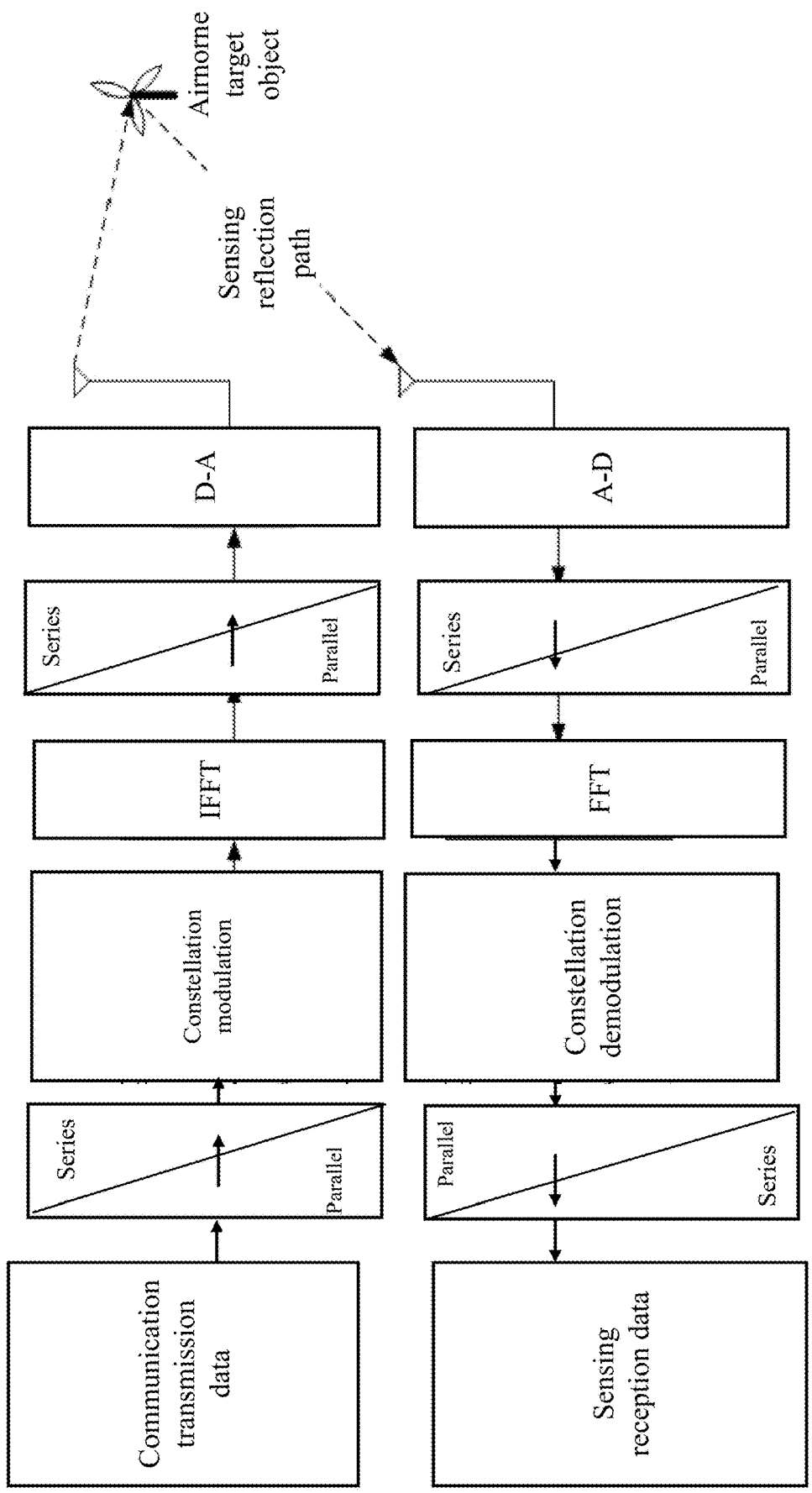
FIG. 3 is a schematic diagram illustrating signal emission and reception in a system for multi-modal sensing and monitoring according to some embodiments of the present disclosure.

In the system 100, a process of detecting the target object using Orthogonal Frequency Division Multiplexing (OFDM) includes the following key steps, as shown in FIG. 3. First, an OFDM system converts communication transmission data from parallel to serial form, and modulates the communication transmission data using constellation mapping to convert the communication transmission data into a communication signal suitable for wireless transmission. The communication signal is then processed via an Inverse Fourier Transform (IFFT) to meet transmission requirements of the OFDM system. After another parallel-to-serial conversion, the communication signal is converted into an analog signal via digital-to-analog (D-A) conversion and transmitted through an antenna. During propagation through the air, the analog signal may be reflected or scattered by the target object. A receiving antenna captures the analog signal and converts the analog signal into a digital signal through analog-to-digital (A-D) conversion for further processing in a digital domain. The received digital signal undergoes serial-to-parallel conversion and is then processed by a Fourier Transform (FFT) to be convert back to a frequency-domain signal for analysis. Subsequently, the OFDM system performs constellation demodulation and parallel-to-serial conversion on the frequency-domain signal to recover original digital data. Finally, by sensing and processing the data, the OFDM system determines the sensing spectrum of the target object. This process demonstrates how OFDM technology enables target detection between a single pair of emission and reception antennas through signal emission, reception, and subsequent processing and analysis, thereby realizing detection and identification of airborne targets.

In some embodiments, the sensing spectrum includes a range-velocity-angle sensing spectrum of the target object. In some embodiments, the sensing spectrum may be decomposed into a range spectrum, a velocity spectrum, and an angle spectrum of the target object. In some embodiments, when constructing the sensing spectrum, the range spectrum and the velocity spectrum may be combined and then aggregated along an angular dimension of the angle spectrum to generate the sensing spectrum.

In some embodiments, the generation module 140 first filters out specific signals from the signal emission node in the reception signal, estimates the range by determining a time difference between signal emission and reception, infers the velocity based on a frequency shift caused by a movement of the target object, and determines the angle based on a difference in signal intensity or a difference in arrival time captured by a plurality of receivers, thereby obtaining the sensing spectrum of the target object.

In some embodiments, in the communication base station sensing mode, the generation module 140 eliminates the emission signal via element-wise division to obtain a communication sensing matrix after signal elimination, denoted as $D_{div}$. Based on the communication sensing matrix $D_{div}$ after signal elimination, the inverse Fourier transform and the Fourier transform are used to estimate a range-velocity sensing spectrum $\Omega$ of the target object.

In some embodiments, the communication sensing matrix $D_{div}$ after eliminating the emission signal is composed of the emission signal-eliminated communication sensing of the n-th subcarrier signal in the μ-th symbol, and may be expressed by:

$$(D_{div})_{\mu,n} = \frac{(D_{Rx})_{\mu,n}}{(D_{Tx})_{\mu,n}} = A(\mu, n) \sum_{k=1}^{K} (\overrightarrow{\omega_R(k)} \otimes \overrightarrow{\omega_D(k)})_{\mu,n},$$

wherein $(D_{div})_{\mu,n}$ denotes the emission signal-eliminated communication sensing of the n-th subcarrier signal in the μ-th symbol, and $\otimes$ denotes a Kronecker product.

In some embodiments, the range-velocity sensing spectrum $\Omega$ of the target object is estimated based on the inverse Fourier transform and the Fourier transform, and may be expression by:

$$\Omega = G^H D_{div} F,$$

wherein G and F denote Fourier matrices along different dimensions, and H denotes complex conjugate transpose. Specifically:

$$G = \begin{bmatrix} 1 & \cdots & 1 \\ \vdots & \exp(-j\mu\mu\pi/N_{sym}) & \vdots \\ 1 & \cdots & -j(N_{sym}-1)(N_{sym}-1)\pi/N_{sym} \end{bmatrix}$$

$$F = \begin{bmatrix} 1 & \cdots & 1 \\ \vdots & \exp(-j\mu\mu\pi/N_{sym}) & \vdots \\ 1 & \cdots & -j(N_c-1)(N_c-1)\pi/N_c \end{bmatrix}$$

wherein $N_{sym}$ represents a count of symbols in the emission signal from the signal emission node and $N_c$ represents the total count of subcarrier signals.

In some embodiments, in the communication relay station sensing mode, the signal reception node demodulates, decodes, and reconstructs the signal received from the emission node to obtain a reception signal matrix $\tilde{D}_{Tx}$ based on the single antenna at the signal reception node. The reception signal matrix $D_{Tx}$ at the time point t is used for emission signal elimination in a single-station active sensing mode, to obtain the communication sensing matrix $D_{div}$ after elimination. The range-velocity sensing spectrum Q is then estimated based on $D_{div}$, inverse Fourier transform, and Fourier transform.

In some embodiments, the communication sensing matrix $D_{div}$ after emission signal elimination is composed of emission signal-eliminated communication sensing of the n-th subcarrier signal in the μ-th symbol, and may be expressed by:

$$(D_{div})_{\mu,n} = \frac{(D_{Rx})_{\mu,n}}{(\tilde{D}_{Tx})_{\mu,n}},$$

wherein $(D_{div})_{\mu,n}$ represents the communication sensing of the n-th subcarrier signal in the μ-th symbol after eliminating the emission signal.

The estimation of the range-velocity sensing spectrum $\Omega$ using the inverse and forward Fourier transforms is the same as that in the communication base station sensing mode and is therefore not repeated here.

In some embodiments, in the communication mobile station sensing mode, a range-velocity spectrum $\Omega(\mu,n)$ of the target object is obtained by processing the emission signal through a cross-ambiguity function between a reference channel and a monitoring channel of the signal reception node. The range-velocity spectrum $\Omega(\mu,n)$ consists of range-velocity components of the n-th subcarrier signal in the μ-th symbol, expressed by:

$$\Omega(\mu, n) = \int_{-\infty}^{\infty} y(t)\breve{y}^*(t + \mu T_{OFDM})e^{j2\pi n\Delta ft}dt,$$

wherein y(t) represents a monitoring channel signal at the time point t, and y̆*(t+μT$_{OFDM}$) represents a reference channel signal at the time point t.

In the three communication sensing operational modes, the angle estimation of the target object is achieved by using multi-antenna reception, and an angle spectrum P$_{DFT}$(θ) of the target object is obtained by Fourier transform, expressed by:

$$P_{DFT}(\theta) = |a^H(\theta)y(t)|^2,$$

wherein θ denotes a discrete value of the angle of the target object relative to the reception node, and a$^H$(θ) represents the complex conjugate transpose of the steering vector for the multi-antenna array.

In some embodiments of the present disclosure, 5G AeroMACS is used to enable efficient transmission and processing of airport surface sensing data. 5G AeroMACS also supports a wide range of connectivity capabilities to connect a large number of sensors and devices. This is a significant advantage for airport surface sensing systems as it facilitates the deployment of additional sensors and monitoring equipment, thereby achieving broader coverage and more granular surveillance. The broad connectivity also ensures scalable system expansion to adapt to evolving operational requirements.

The high bandwidth and reliability of 5G AeroMACS permit rapid transmission of large-scale data. In airport surface sensing systems, this enables real-time delivery of high-resolution spectra and voluminous sensing data without bandwidth-induced packet loss or latency. The high-bandwidth capability is critical for complex spectral analysis and data fusion tasks, guaranteeing both data integrity and real-time performance. Sensing spectrums from individual sensing stations are quantized, compressed, and encoded into dedicated perception data packets. Leveraging advanced network management and error control mechanisms, transmission errors and packet loss are minimized, allowing aggregated sensing data from all stations to be transmitted to a central processing base station via 5G channels.

In addition, the low-latency nature of 5G AeroMACS is critical for real-time data processing. Fast response is key in airport surface sensing. 5G AeroMACS achieves millisecond-level latency, significantly accelerating a workflow from data acquisition to processing and decision support, which is particularly vital for emergency response scenarios. Adaptive scheduling algorithms dynamically optimize network access and routing to ensure timely delivery of sensing data packets.

In 550, determining, based on the sensing spectrum, a sensing and monitoring result of the target object. The sensing and monitoring result includes at least one of a location, a confidence level, and a class of the target object.

In some embodiments, the detection module 150 may determine the sensing and monitoring result of the target object based on the sensing spectrum in a plurality of ways.

The sensing and monitoring result refers to the relevant monitoring data of the target object generated based on the system 100, which may include the location, the confidence level, the class, etc., of the target object.

Figure 4:
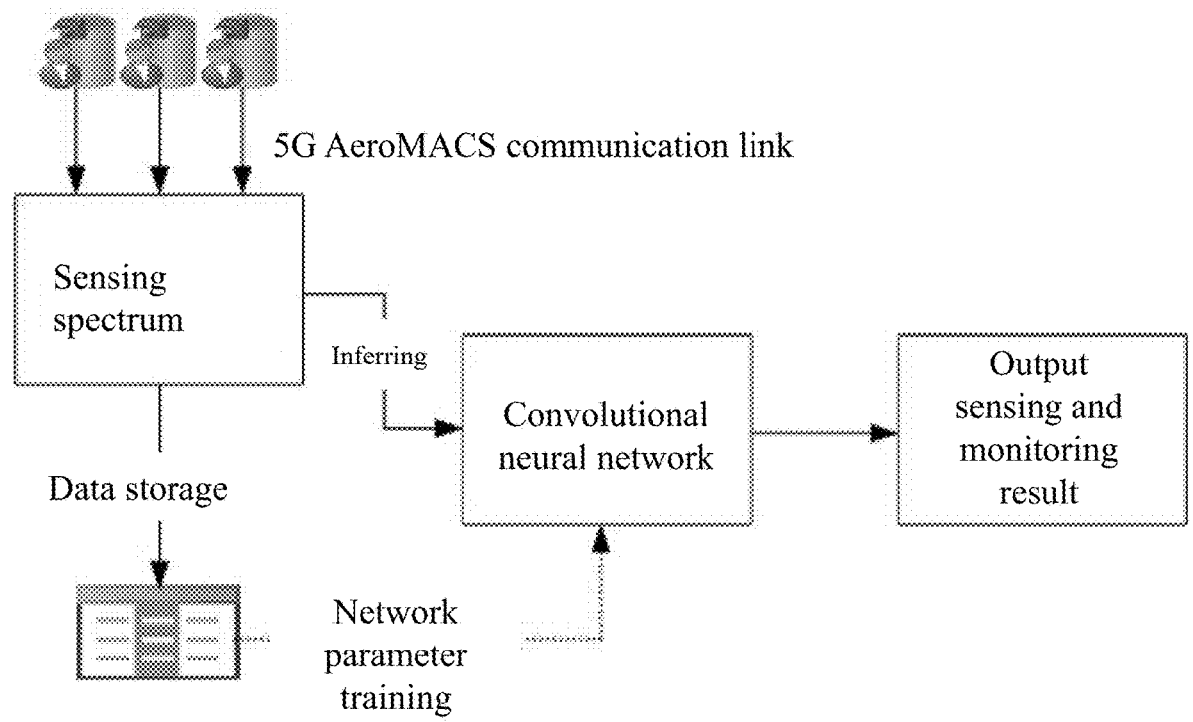
FIG. 4 is a processing framework diagram of a sensing spectrum of a system for multi-modal sensing and monitoring according to some embodiments of the present disclosure.

In some embodiments, the detection module 150 may determine the sensing and monitoring result of the target object based on the sensing spectrum via a machine learning model. As shown in FIG. 4, the detection module 150 may determine the sensing and monitoring result of the target object based on the sensing spectrum via a convolutional neural network (CNN), collect and store a historical sensing spectrum in a database, train the convolutional neural network based on the historical sensing spectrum to optimize model parameters. After the training is completed, the detection module 150 may perform inference on the sensing spectrum using the CNN to determine and output an accurate sensing and monitoring result of the target object. More descriptions may be found in the following operations S11-S13. The CNN includes a first detection model and a second detection model.

In S11, determining a three-dimensional (3D) detection bounding box of the target object by performing information fusion on the sensing spectrum based on the first detection model.

In some embodiments, the first detection model includes a fusion detection network, a spatial channel attentional module (SCAM), a shared multilayer perceptron (MLP), a spatial attention (SA) module, a generative spatial attention map, and an attention mechanism module.

In some embodiments, the fusion detection network may be configured to obtain the 3D detection bounding box of the target object. In some embodiments, the fusion detection network may include a 3D backbone network, a 3D neck network, and a 3D detection head. The SCAM may be configured to augment the 3D neck network to capture critical information; the MLP may be composed of hidden layers; and the SA module may be configured to generate a spatial attention map. The spatial attention map is a spatial attention-related feature map. The attention mechanism module may be configured to perform a spatial attention operation.

In some embodiments, an input of the first detection model is the sensing spectrum, and an output of the first detection model is the 3D detection bounding box of the target object.

In some embodiments, the detection module 150 may perform standardization processing on the sensing spectrum to obtain a standardized spectrum.

In some embodiments, the standardization processing may include: subtracting an arithmetic mean of the sensing spectrum from the sensing spectrum and dividing by a standard deviation of the sensing spectrum to obtain the standardized spectrum.

In some embodiments, the detection module 150 processes the standardized spectrum based on the fusion detection network to obtain the 3D detection bounding box of the target object. More description may be found in the description related to operations S21 to S23 below.

In some embodiments, S21 includes: inputting the standardized spectrum into the 3D backbone network of the fusion detection network to obtain an aggregated feature map output from the 3D backbone network.

Figure 7:
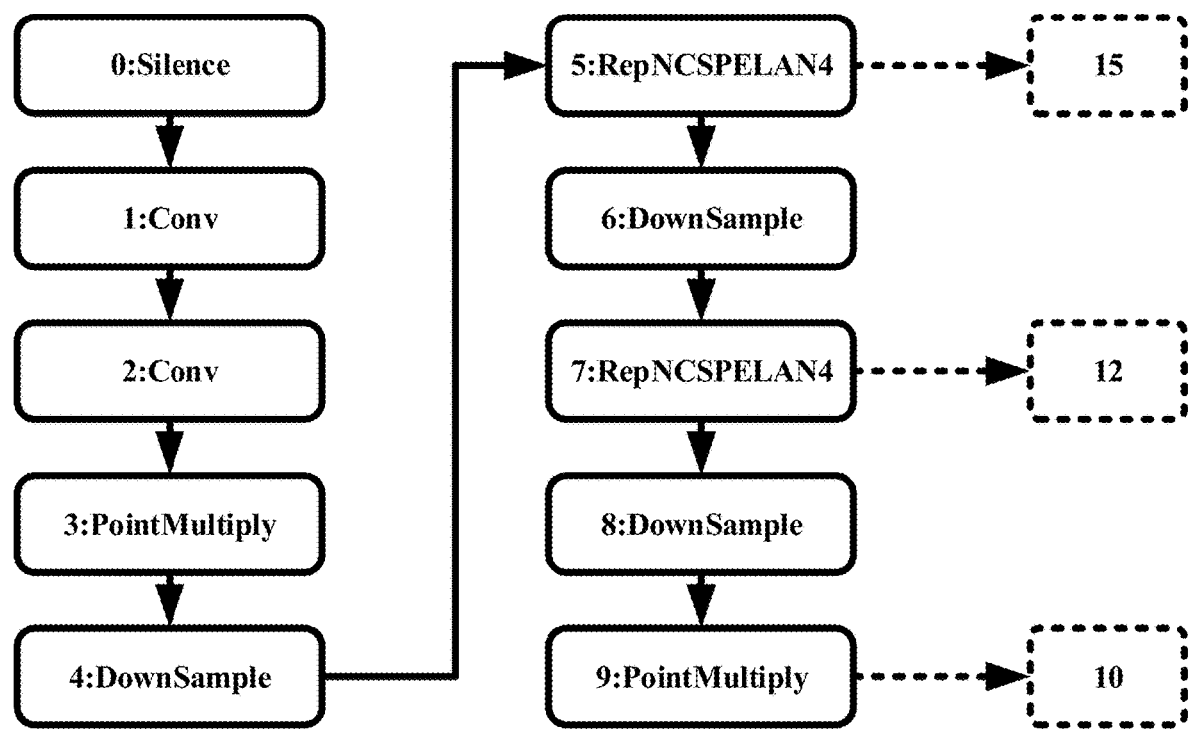
FIG. 7 is a schematic diagram of a backbone network in a system for multi-modal sensing and monitoring according to some embodiments of the present disclosure.

For example, in forward propagation of the 3D backbone network, generated feature maps are transmitted along a direction indicated by the arrows shown in FIG. 7 to obtain the aggregated feature map output by the 3D backbone network.

As shown in FIG. 7, the 3D backbone network consists of network modules from Network Module 0 to Network Module 9, which are configured to extract high-level features from the input standardized spectrum and to reduce redundant information in the standardized spectrum for subsequent in-depth processing by the 3D backbone network. The ten network blocks in the 3D backbone network are sequentially connected in an input-output manner. For example, an output of Network Module 0 is an input to Network Module 1, and an output of Network Module 1 is an input to Network Module 2. Additionally, Network Modules 5, 7, and 9 include duplicated output ports, labeled as Output Ports 15, 12, and 10, respectively.

In some embodiments, in Network Module 3, the 3D backbone network consists of an alternating combination of PointMultiply and RepNACPELAN4 network structures, and this embodiment uses the PointMultiply module for initial feature extraction and minimum feature maps in the 3D backbone to improve an ability to capture global target information and small target information.

In some embodiments, feature augmentation is implemented using a point-wise multiplication network, an operation capable of mapping inputs to a high-dimensional non-linear feature space without increasing a width of the network. In a single layer of the neural network structure of the fusion detection network, high-dimensional feature mapping is implemented via element-wise multiplication.

By employing this approach, embodiments of the present disclosure are able to enhance a representational capacity of the network without altering the width of the network. This is because element-wise multiplication inherently creates all possible interactive combinations between features, thereby increasing the feature dimensionality without adding parameters. When a plurality of such layers are stacked, the implicit dimensionality of features can grow exponentially, theoretically achieving an infinite-dimensional feature space, which equips the model with robust capabilities to learn and represent complex data patterns.

In some embodiments, the RepNACPELAN4 in Network Modules 5 and 7 includes a Convolution-BatchNorm-SiLU (CBS) module, a RepNBottleNeck module, and a RepNCSP module.

In some embodiments, the CBS module includes a two-dimensional (2D) convolution layer, a 2D batch normalization layer, and a SiLU activation function module.

In some embodiments, the RepNBottleneck module includes a RepNBottleneck[CV1] convolutional layer and a RepNBottleneck[CV2] convolutional layer arranged in parallel. The RepNBottleneck[CV1] convolutional layer includes a CBS module, the RepNBottleneck[CV2] convolutional layer includes two CBS modules. Outputs of the RepNBottleneck[CV1] convolutional layer and the RepNBottleneck[CV2] convolutional layer are summed to obtain an output feature map of RepNBottleneck module.

In some embodiments, the RepNCSP module is modeled as a sequential structure including a plurality of sub-modules. Each of the plurality of sub-modules includes a CBS module and a RepNBottleneck module. In the sub-modules, features of feature maps obtained by the CBS module and the RepNBottleneck module are concatenated to obtain aggregated features, which are further processed by the CBS module to obtain the aggregated feature map.

In some embodiments, the forward propagation of the RepNCSP module may be represented by:

$$f_{RepNCSP(x)} = f(f(x)),$$

wherein $f_{RepNCSP(x)}$ represents an output of the RepNCSP module; f(x) represents the sub-modules of RepNCSP; and x represents the feature maps obtained from the CBS and RepNBottleneck modules that are input to the RepNCSP module.

In some embodiments, f(x) is determined by an equation including:

$$f(x) = CVout,3(torch.cat((m(CVout,1(x)),CVout,2(x)), dim=1)),$$

wherein CVout, 3(x) represents a final convolutional layer of the RepNCSP module; torch.cat(.) represents a 3D feature map concatenation operation; m(.) represents processing the feature map using the RepNBottleneck module; CVout, 1(x) represents a first CBS module; CVout, 2(x) represents an output of a second CBS module; dim represents a 1st dimension along the 3D feature map.

The RepNCSP module and the CBS module are stacked to obtain a RepNCSPELAN4 module to enhance feature extraction and integration mechanisms. The RepNCSPELAN4 module includes a top-level convolutional layer that performs initial feature extraction on the input tensor. Subsequently, the feature map undergoes a Chunk operation, which forks the channel and directs it to the processing paths of the subsequent convolutional layers CVout, 2(x) and CVout, 3(x), each of which is a constituent of the RepNCSP. After feature concatenation, further feature extraction using the final $CV_{up,4}(x)$ yields the output feature map of the RepNCSPELAN4 module.

In some embodiments, S22 includes: obtaining an output F''' of the SA module by processing the aggregated feature map output from the 3D backbone network using the 3D neck network of the fusion detection network.

In some embodiments, the 3D neck network uses a feature pyramid network (FPN) for secondary processing of the high-level features (e.g., the aggregated feature map) extracted by the 3D backbone network for fully integrating the features at different scales, thereby enhancing the multi-scale detection performance of the fusion detection network.

Figure 8:
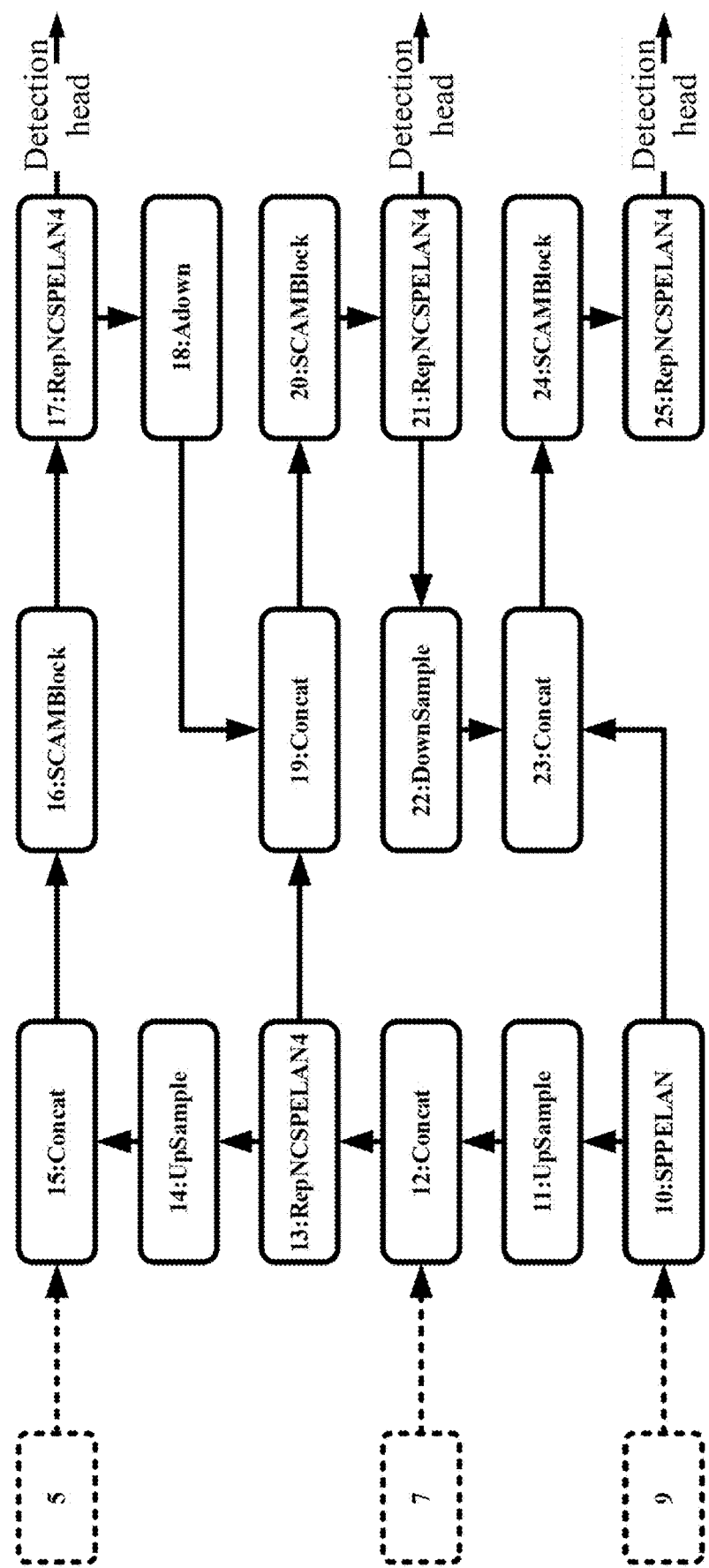
FIG. 8 is a schematic diagram of a neck network in a system for multi-modal sensing and monitoring according to some embodiments of the present disclosure.
Figure 9:
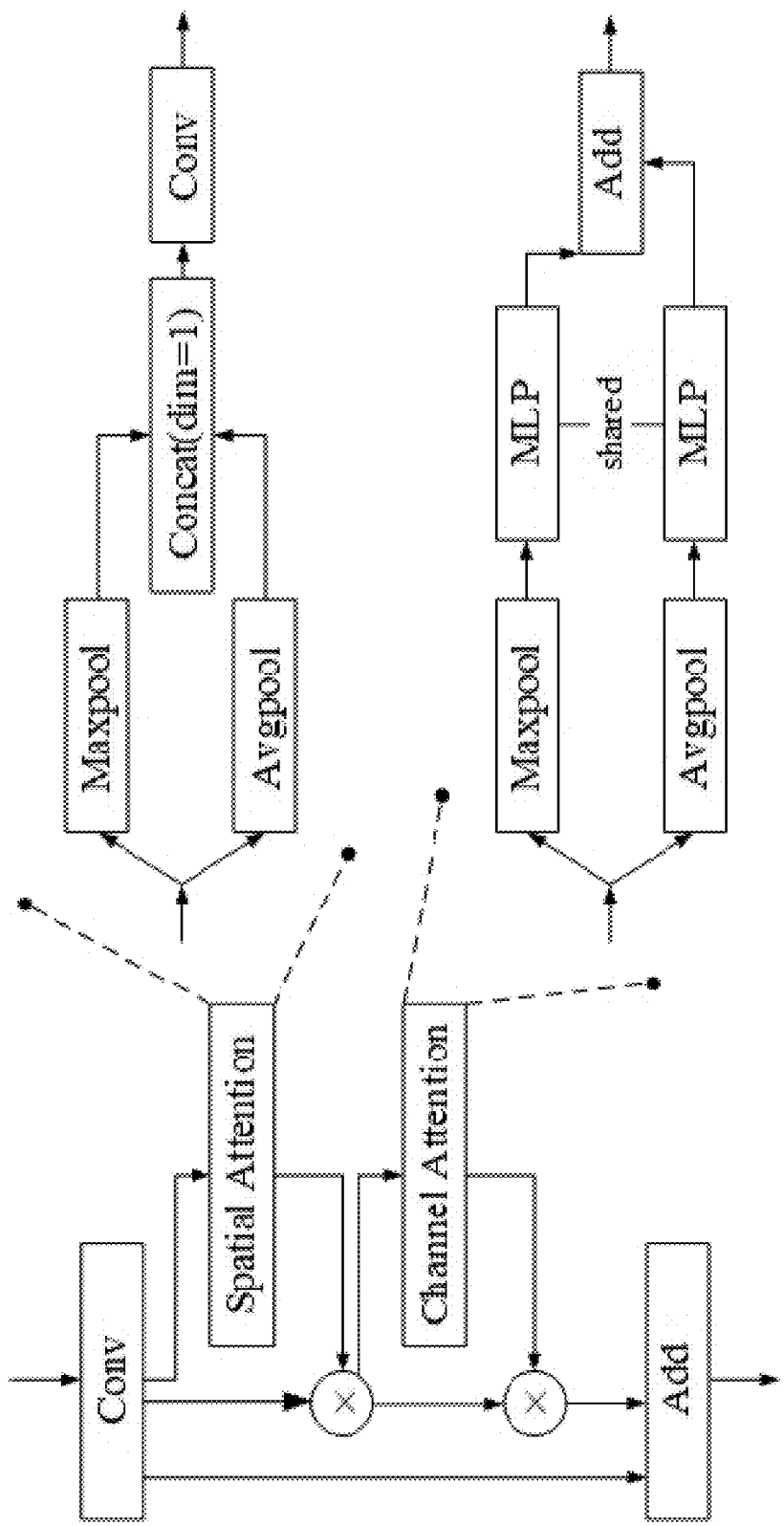
FIG. 9 is a schematic diagram of a spatial-channel attention model in a system for multi-modal sensing and monitoring according to some embodiments of the present disclosure.

In some embodiments, the 3D neck network includes Network Modules 10 to 25, as shown in FIG. 8. An input to Network Module 10 is an output of a replica port of Network Module 9, an input to Network Module 11 is an output of Network Module 10, an input to Network Module 12 is the output of Network Module 7 and an output of the 11th Network Module 11, an input to Network Module 13 is an output of Network Module 12, an input to Network Module 14 is an output of Network Module 13, an input to Network Module 15 is an output of Network Module 15 and an output of Network Module 14, an input to Network Module 16 is an output of Network Module 15, an input to Network Module 17 is an output of Network Module 16, an input to Network Module 18 is an output of Network Module 17, an input to Network Module 19 is the output of Network Module 13 and an output of Network Module 18, an input to Network Module 20 is an output of Network Module 19, an input to Network Module 21 is an output of Network Module 20, an input to Network Module 22 is an output of Network Module 21, an input the 23rd Network Module 23 is the output of Network Module 10 and an output of Network Module 22, an input to Network Module 24 is an output of Network Module 23, and an input to Network Module 25 is an output of Network Module 24.

In some embodiments, structures of Network Modules 16, 20, and 24 introduce the SCAM combined with the spatial attention module and the channel attentional module. The SCAM is designed to enhance the ability of the model to capture critical information through fine-grained feature reconstruction, thereby improving the accuracy of the detection of the target object. Three spatial channel attentional module blocks (SCAMBlocks) are added before the RepNACPELAN4 blocks near three detection heads. By utilizing the channel and spatial attention mechanisms of the SCAMBlocks, the 3D neck network can better distinguish and focus on the most informative features, thus improving the accuracy and robustness in detecting the target object.

For example, the structure of the SCAM is designed as follows: an aggregated feature map $F \in C \times H \times W$ is input into the SCAM, and average pooling (AvgPool) and maximum pooling (MaxPool) are applied to process compressed spatial dimensions of the aggregated feature map F to extract a channel-wise average value $$F_{avg}^c$$

and a channel-wise maximum value $$F_{max}^c,$$

represented by $$F_{avg}^c = AvgPool(F), F_{max}^c = MaxPool(F)$$

The channel-wise average value $$F_{avg}^c$$

and the channel-wise maximum value $$F_{max}^c$$

are passed to the shared multilayer perceptron (MLP) to obtain a feature map F' after a channel attention operation through the following operations:

First, the channel average-wise value $$F_{avg}^c$$

and the channel-wise maximum value value $$F_{max}^c$$

are merged by element-wise summation to form a channel attention map $M^c(F)$, represented by:

$$M^c(F) = \sigma(MLP(F_{avg}^c) + MLP(F_{max}^c)),$$

wherein σ represents a sigmoid activation function, which ensures that values in the channel attention map are normalized between 0 and 1 to regulate the channel of the input feature map.

In some embodiments, the MLP is composed of hidden layers.

Then, the channel attention mechanism is implemented by using element-wise multiplication to obtain the feature map F' after the channel attention operation, represented by:

$$F' = M^c(F) \odot F$$

wherein F represents the input aggregated feature map; $M^c(F)$ represents the channel attention map; and F' represents the feature map F' after the channel attention operation.

In some embodiments, based on the feature map F' after the channel attention operation, an average spatial attention feature map $$F_{avg}^s$$

and a maximum spatial attention feature map $$F_{max}^s$$

are obtained by performing average pooling and maximum pooling operations along a channel axis in the SA model, and a valid spatial feature descriptor $F^s$ is obtained by concatenating the average spatial attention feature map $$F_{avg}^s$$

and the maximum spatial attention feature map $$F_{max}^s.$$

In some embodiments, the average spatial attention $$F_{avg}^s$$

and the maximum spatial attention feature map $$F_{max}^s$$

are represented by:

$$F_{avg}^s = AvgPool(F'), F_{max}^s = MaxPool(F').$$

In some embodiments, concatenating the average spatial attention feature map $$F_{avg}^s$$

and the maximum spatial attention feature map $$F_{max}^s$$

to obtain the valid spatial feature descriptor $F^s$ is represented by:

$$F^2 = [F^s_{avg}; F^s_{max}].$$

In some embodiments, the valid spatial feature descriptor $F^s$ is processed to obtain a spatial attention map $M^s(F')$ using a generative spatial attention map $M^s$ comprising a 7×7 convolutional layer $f_{7\times7}$, expressed by:

$$M^s(F')=\sigma(f_{7\times7}(F^s)).$$

In some embodiments, based on the feature map F' and the spatial attention map $M^s(F')$ after the channel attention operation, a spatial attention operation is performed by the attention mechanism module to obtain an output of the channel attention mechanism module, expressed by:

$$F''=M^s(F')\odot F',$$

wherein F' represents the output of the channel attention module; F'' represents the output of the spatial attention mechanism module; and $M^s(F')$ represents the spatial attention map.

In some embodiments, S23 includes: extracting the class and the spatial location of the target object from the output of the 3D neck network using the 3D detection head of the fusion detection network, and outputting a final 3D detection bounding box In some embodiments, a ground truth bounding box of each target object is represented by a 10-parameter vector. The final 3D detection bounding box includes six parameters describing the location of the target object, three parameters describing the class of the target object, and one parameter describing the confidence level of the target object.

In some embodiments, the 3D detection bounding box and the ground truth bounding box have a same dimensionality. The 3D detection bounding box is a predicted value of the target object, and the ground truth bounding box is a ground true value of the target object for network training.

Figure 10:
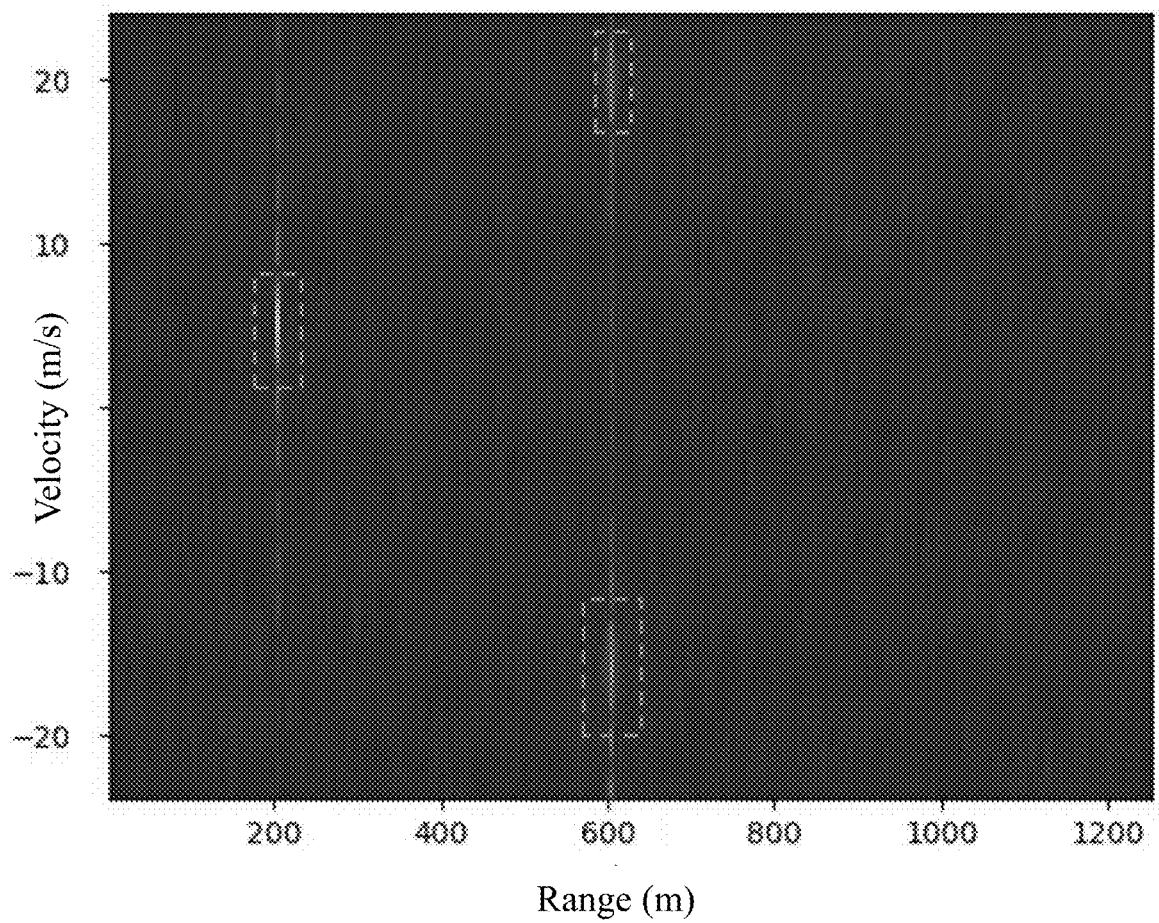
FIG. 10 is a schematic diagram of a range-velocity profile of a three-dimensional (3D) detection target in a system for multi-modal sensing and monitoring according to some embodiments of the present disclosure.
Figure 11:
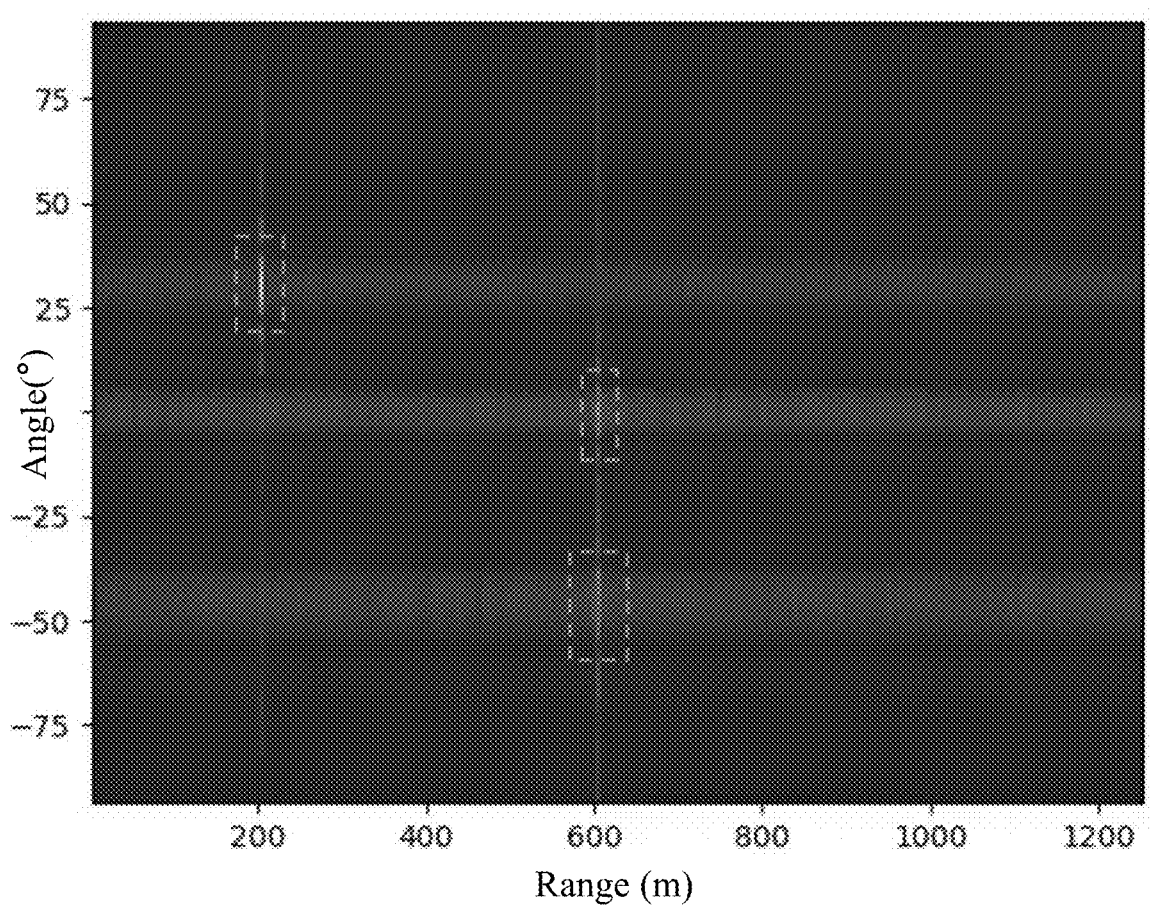
FIG. 11 is a schematic diagram of a range-angle profile of a 3D detection target in a system for multi-modal sensing and monitoring according to some embodiments of the present disclosure.

In some embodiments, the six parameters describing the location of the target object include: an average target range, a range dimension extension width, an average target velocity, a velocity dimension extension width, an average target angle, and an angle dimension extension width. For example, in FIG. 10 and FIG. 11, a total of three target objects are detected, average target ranges of the three target objects are 200 m, 600 m, and 600 m, respectively. Range dimension extension widths of the three target objects are 64 m, 46 m, and 75 m, respectively. Average target velocities of the three target objects are 5 m/s, 20 m/s, −15 m/s, respectively. Velocity dimension extension widths of the three target objects are 7 m/s, 6 m/s, 8 m/s, respectively. Average target angles of the three target objects are 30°, 0°, −45°, respectively. Angle dimension extension widths of the three target objects are 23°, 22°, and 26°, respectively.

In some embodiments, the class of the target object includes an aircraft class, a vehicle class, a human class, or the like. For example, a parameter [1, 0, 0] represents the aircraft class, a parameter [0, 1, 0] represents the vehicle class, and a parameter [0, 0, 1] represents the human class.

In some embodiments, the confidence level of the target object takes a value in a range from 0 to 1. A value closer to 1 represents a higher detection accuracy of the target. For example, in FIG. 10 and FIG. 11, the confidence levels of the three target objects are 0.92, 0.81, and 0.86, respectively.

In some embodiments, for the class of the target object, a softmax function is used to convert the predicted values of the three classes of the target object into probability values that sums to 1, and the class of the target object that has a largest probability value is taken as a predicted class of the target object. The class of the target object may be represented by:

$$y_l = \text{softmax}(x_l) = \frac{e^{x_l}}{\sum_{l=1}^{3} e^{x_l}},$$

wherein l represents a class index, $y_l$ represents the predicted class of the target object; x represents the predicted value of the target object class output by the 3D detection head of the fusion detection network; $e^{x_l}$ represents a probability value of an l-th class based on a natural constant e.

Figure 6:
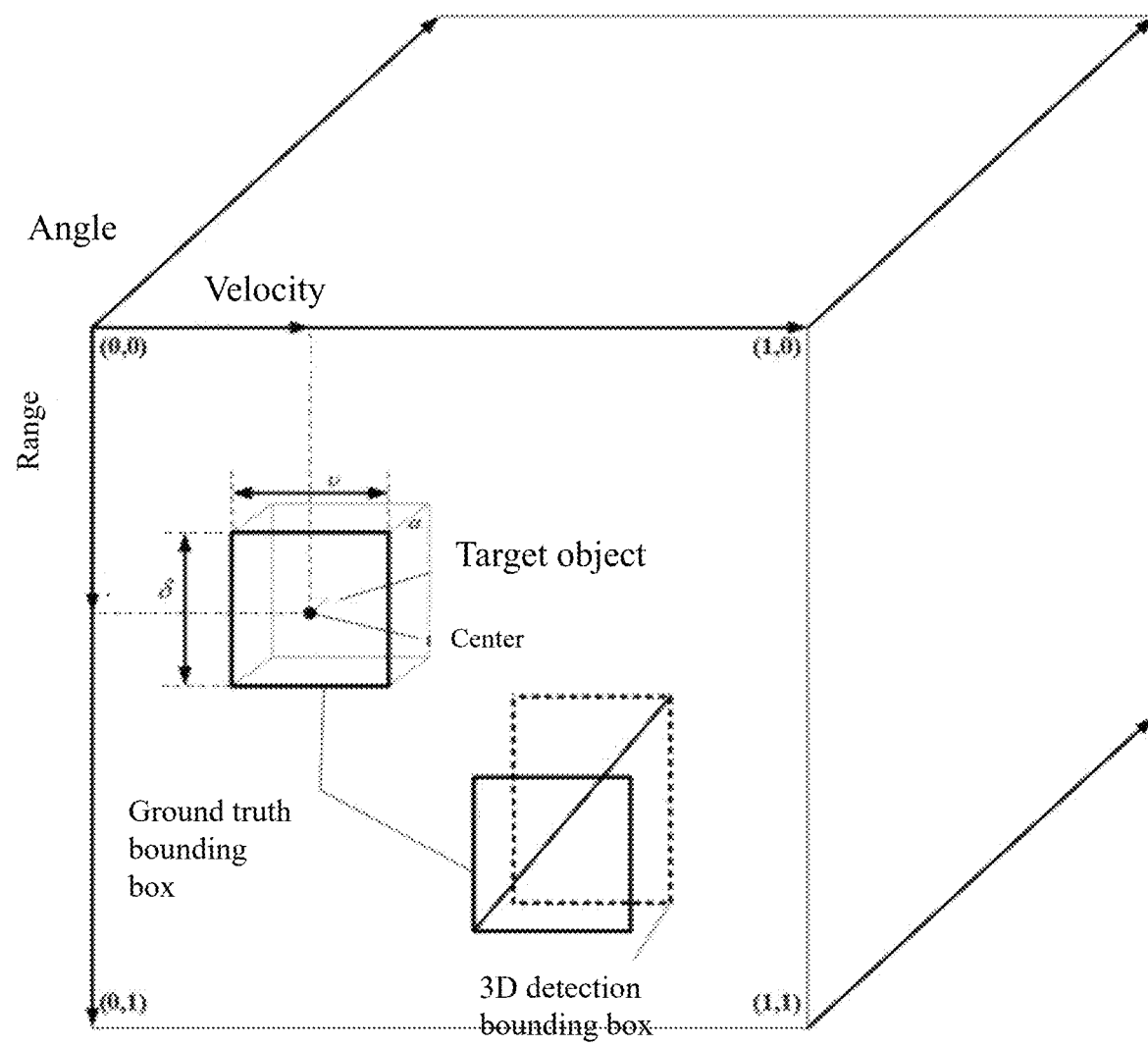
FIG. 6 is a schematic diagram illustrating neural network labeling in a system for multi-modal sensing and monitoring according to some embodiments of the present disclosure.

In some embodiments, FIG. 6 illustrates the target object on the sensing spectrum and the bounding boxes corresponding to the target object, wherein the ground truth bounding box is indicated by solid lines and the detection bounding box is indicated by dashed lines. As shown in FIG. 6, a width and a height of the range-velocity spectrum of the target object are normalized, and all line segments are also equally scaled.

In S12, determine the second detection model based on the 3D detection bounding box and the ground truth bounding box of the target object.

In some embodiments, the acquisition of the second detection model includes: obtaining a loss between the 3D detection bounding box and the ground truth bounding box (i.e., the ground truth) of the target object through a loss function. The loss includes a class loss, a localization loss, and a confidence loss. A gradient of network parameters is obtained using a backpropagation algorithm, and a validation set is used to determine whether the second detection model achieves performance convergence. If performance convergence is achieved, the trained second detection model is obtained. If performance convergence is not achieved, initial weights or a learning rate during network training are adjusted.

In some embodiments, the class loss $L_{class}$ describes the class of the target object, and may be represented by:

$$L_{class} = -\sum_{l=1}^{3} y_l \log(y_l),$$

wherein l represents the class index, $y_l$ represents the predicted class of the target object.

In some embodiments, the location loss $L_{local}$ of the target object is expressed by:

$$L_{local}=w_R(R-\overline{R})^2+w_\delta(\delta-\overline{\delta})^2+w_V(V-\overline{V})^2+w_\upsilon(\upsilon-\overline{\upsilon})^2+w_A(A-\overline{A})^2+w_\alpha(\alpha-\overline{\alpha})^2,$$

wherein $w_R$ represents a weight for the range of the target object, R represents a range value output by the second detection model, $\overline{R}$ represents a ground truth range value of the target object, $w_\delta$ represents a weight for the range dimension extension width, $\delta$ represents a range dimension extension width output by the second detection model, $\overline{\delta}$ represents a ground truth range value of the target object, $w_V$ represents a weight for the velocity of the target object speed weight, V represents a velocity value output by the second detection model, $\overline{V}$ represents a ground truth value of the velocity of the target object, $w_\upsilon$ represents a weight for the velocity dimension extension width, $\upsilon$ represents a velocity dimension extension width output by the second detection model, $\overline{v}$ represents a ground truth value of the velocity dimension extension width of the target object, $w_A$ represents a weight for the angle of the target object, A represents an angle value output by the second detection model, $\overline{A}$ represents a target angular ground truth value, $w_\alpha$ represents the angular dimension extension width, $\alpha$ represents the angular dimension extension width output by the second detection model, and $\overline{\alpha}$ represents a target angular width ground truth value.

In some embodiments, the confidence loss $L_{gr}$ of the target object is expressed by:

$$L_{gr}=1-p_{gr},$$

wherein $p_{gr}$ denotes the confidence level of the target object.

In S13, determining the sensing and monitoring result of the target object based on the second detection model.

In some embodiments, the sensing and monitoring result of the target object may be obtained using a trained second detection model. The sensing and monitoring result of the target object is the detection bounding box of the target object. In some embodiments, the sensing and monitoring result of the target object includes the location, the class, and the confidence level of the target object.

In some embodiments, a signal emission parameter of the signal emission node and a signal reception parameter of the signal reception node may be updated, and a location of the communication mobile station may be adjusted. More description can be found in the description related to operations S31-S33 below.

In S31, at each of a plurality of target time points, determining a confidence drop value corresponding to the target time point based on an average confidence level corresponding to the target time point and an average confidence level corresponding to a previous target time point.

In some embodiments, the target time point may be set manually.

The confidence level refers to the detection accuracy of the target object. More description of the confidence level of the target object can be found above and in the description of FIGS. 10 and 11.

In some embodiments, the confidence drop value refers to a difference between the average confidence level corresponding to the target time point and the average confidence level corresponding to the previous target time point.

It is important to note that a decrease in the confidence level may indicate a change in the class of the target object, and does not necessarily indicate a low accuracy. A consistent decline in the confidence level across a plurality of target objects over a period may indicate reduced detection accuracy or insufficient detection data volume.

In S32, in response to the confidence drop value at the target time point being greater than a preset threshold, updating the signal emission parameter and the signal reception parameter at the target time point, generating a signal emission instruction and a signal reception instruction based on an updated signal emission parameter and an updated signal reception parameter, and sending the signal emission instruction and the signal reception instruction to the signal emission node and the signal reception node, respectively. The preset threshold may be set manually or determined based on historical experience.

The signal emission parameter refers to information related to signals emitted by the signal emission node. In some embodiments, the signal emission parameter may include a signal emission frequency, a signal strength, or the like.

The signal reception parameter refers to information related to signals received by the signal reception node. In some embodiments, the signal reception parameter may include a signal reception sensitivity, a filtering threshold, a beam direction of a reception antenna, or the like. The filtering threshold is a critical value used by the signal reception node to distinguish valid signals from noise. The beam direction of the reception antenna indicates an angle at which the antenna is most sensitive when receiving a signal, analogous to how a beam of a flashlight concentrates in a specific direction.

The signal emission instruction controls the signal emission node to emit a communication signal, and the signal reception instruction controls the signal reception node to receive the communication signal.

In some embodiments, in response to the confidence drop value at the target time point being greater than the preset threshold, the adjustment module 180 automatically triggers the generation of the signal emission instruction, the signal reception instruction, and a movement instruction.

In some embodiments, updating the signal emission parameter and the signal reception parameter at the target time point includes: updating the signal emission parameter and the signal reception parameter based on the operational mode. More description of the operational mode can be found in the related description of FIG. 1.

In some embodiments, in the communication base station sensing mode, if the detection module 150 detects a confidence drop, and the adjustment module 180 may prioritize adjusting the signal emission parameter of the communication base station. For example, the adjustment module 180 may increase the signal strength of the communication signal to enhance an echo strength or switch to a higher frequency band to improve resolution. In some embodiments, in the communication base station sensing mode, if the detection module 150 detects a confidence drop, the adjustment module 180 may optimize the signal reception parameter of the communication base station. For example, the adjustment module 180 may lower the filtering threshold to ensure that weak echo signals are also captured.

In some embodiments, in the communication relay station sensing mode, if the detection module 150 detects a decrease in the confidence level, the adjustment module 180 may collaboratively adjust the signal emission parameter of the communication base station and the communication relay station. For example, the adjustment module 180 may adjust the signal emission frequency of the communication base station to better adapt to long-range transmission and enhance the signal reception sensitivity of the communication relay station.

In some embodiments of the present disclosure, by adjusting the signal emission parameter of the communication base station and the communication relay station, the signal coverage can be balanced with the anti-jamming capability.

In some embodiments, in the communication mobile station sensing mode, the adjustment module 180 dynamically adjusts the beam direction of the reception antenna according to a real-time location of the communication mobile station to always align with a signal source direction. For example, the beam direction of the reception antenna is adjusted by electronic steering. The electronic steering refers to the technology of changing the beam direction by electronic control (instead of physically rotating the antenna). By adjusting phase differences of signals across a plurality of elements in an antenna array, flexible beam direction switching is achieved. This technology eliminates the need for physical antenna movement, offers faster response times, and is suitable for dynamic scenarios.

In some embodiments, in the communication mobile station sensing mode, if the mobile station signal is weak, the communication base station or the communication relay station may be triggered to increase the count of signal transmissions in the target region to ensure that the communication mobile station receives complete data.

In some embodiments of the present disclosure, updating the signal emission parameter and the signal reception parameter can maintain the total acquired data volume while improving signal quality, thereby increasing the confidence level.

In S33, generating a target location at the target time point, and generating the movement instruction based on the target location.

The movement instruction controls a movement of the communication mobile station.

The target location refers to a position that the communication mobile station needs to move to.

In some embodiments, when the detection module 150 detects a confidence drop of the target object, the target location may be dynamically generated based on a preset rule.

In some embodiments, the preset rule may include: determining a root cause of a problem based on a signal attenuation feature, and generating the target location based on the root cause of the problem. For example, if the confidence drop is caused by obstacle obstruction, the adjustment module 180 automatically plans a detour route so that the communication mobile station is moved to an unobstructed region. If the confidence drop is caused by excessive range, the communication mobile station gradually moves closer to the target direction. If the confidence drop is caused by multi-device signal interference, the communication mobile station moves laterally to avoid a source of the interference.

In some embodiments, generating the target location at the target time point includes: determining a predicted motion trajectory of the target object based on the sensing spectrum though a temporal model, and determining the target location based on the predicted motion trajectory. For example, the adjustment module 180 predicts, based on the sensing spectrum of the target object, a position to which the target object may move in the future, generates the target location, and moves the communication mobile station to the target location in advance.

The sensing spectrum of the target object is a dynamically updated spectrum reflecting a real-time state of the target object, and is used to describe a dynamic relationship between the target object and the communication mobile station. In the sensing spectrum of the target object, the range refers to a range between the target object and the communication mobile station, the velocity represents how fast the target object moves, and the angle denotes an orientation of the target object relative to the communication mobile station.

In some embodiments, the temporal model is a machine learning model. In some embodiments, the temporal model is a long short-term memory (LSTM) network, a transformer, or the like.

In some embodiments, an input to the temporal model is a current sensing spectrum of the target object, and an output of the temporal model is the predicted motion trajectory of the target object.

In some embodiments, the temporal model is acquired by training based on a first training sample dataset. The first training sample dataset includes first training samples and first training labels corresponding to the first training sample. In some embodiments, the first training sample may include a sample sensing spectrum of the target object at a first time point, and the first training label is a sample motion trajectory of the target object at a second time point. The second time point is after the first time point.

In some embodiments, the temporal model is trained by performing a plurality of rounds of iterations. At least one round of iterations includes: selecting one or more first training samples from the first training sample dataset, inputting the one or more first training samples into an initial temporal model to obtain the future motion trajectory of the target object corresponding to the one or more first training samples; determining a loss function based on the future motion trajectory of the target object corresponding to the one or more first training samples and the label(s) of the one or more first training samples by substituting them into a formula for a preset loss function; and updating parameters of the initial temporal model inversely by gradient descent or the like based on the loss function. When a preset condition is satisfied, the training of the temporal model is completed, and a trained temporal model is obtained. The preset condition may be that the loss function converges, the count of iterations reaches a threshold, or the like.

In some embodiments, the first training label may be obtained by collecting historical data. The historical data includes actual motion trajectories of the target object during a historical time period, and the sensing spectrum of the target object corresponding to each of the actual motion trajectories and the first training samples and corresponding labels generated based on the actual motion trajectories of the target object.

In some embodiments, when the adjustment module 180 predicts that the target object will move toward a specific location, the adjustment module 180 controls the communication mobile station to advance toward a region corresponding to the specific location. For example, if an aircraft is predicted to turn right, the adjustment module 180 controls at least one communication mobile station to synchronously move to a predicted arrival location of the aircraft to maintain a monitoring angle In some embodiments of the present disclosure, predicting the motion trajectory of the target object by the temporal model and generating the target location based on the motion trajectory can improve target tracking accuracy and response speed, while reducing monitoring blind spots and signal delays In some embodiments, the output of the temporal model further includes a potential collision risk.

The potential collision risk refers to collisions or trajectory overlaps between the target object and other objects or regions during movement. For example, the potential collision risk may include an aircraft taxiway conflict, a vehicles illegally entering a restricted airspace, etc.

In some embodiments, the system 100 may determine whether there is a collision risk in the actual motion trajectory of the target object based on the potential collision risk. For example, in response to the potential collision risk being below a safety threshold, the collision risk is determined to exist, and an alert is triggered. The safety threshold may be set manually or determined based on historical experience.

In some embodiments, the first training label further includes a sample actual motion trajectory of the target object and an actual collision risk corresponding to the actual motion trajectory. In some embodiments, the first training label may be determined by binary labeling. For example, in response to the target object having an actual conflict in the actual motion trajectory, the actual collision risk is labeled as 1; in response to the target object having no actual conflict in the actual motion trajectory, the actual collision risk is labeled as 0. In some embodiments of the present disclosure, a hazardous scenario can be pre-judged in advance by determining the potential collision risk of the target object in the actual motion trajectory, thereby reducing collision probability and decreasing manual monitoring workload.

In some embodiments, the adjustment module 180 may be further configured to: at each of the plurality of target time points: in response to real-time traffic corresponding to the target time point satisfying a preset condition, update the signal emission parameter and the signal reception parameter at the target time point based on the real-time traffic and an environmental parameter, and generate the movement instruction to control the movement of the communication mobile station.

In some embodiments, the preset condition may be set manually. In some embodiments, the preset condition may be that the real-time traffic corresponding to the target time point is greater than a high traffic threshold, or the real-time traffic corresponding to the target time point is less than a low traffic threshold. For example, in response to the real-time traffic corresponding to the target time point being greater than the high traffic threshold, the adjustment module 180 automatically switches to a cooperative sensing mode between the communication base station and the communication relay station to improve data collection efficiency. In response to the real-time traffic corresponding to the target time point being less than the low traffic threshold, the adjustment module 180 automatically switches to an energy-saving mode of the communication mobile station to reduce power consumption.

The real-time traffic is a count of target objects and an amount of data transmitted in the target region.

The environmental parameter refers to an external factor that affects the transmission of communication signals. For example, the environmental parameter may include a weather condition, a flight density, or the like.

In some embodiments, the adjustment module 180 may update the signal emission parameter and the signal reception parameter based on the real-time traffic and the environmental parameter at the target time point by establishing a lookup table, and generate the movement instruction to control the movement of the mobile station. For example, when the flight density is high, i.e., when the real-time traffic is greater than the high traffic threshold, more communication base stations and communication mobile stations are automatically enabled to enhance positioning accuracy. When heavy rainfall causes attenuation of the communication signal, more communication relay stations are enabled to enhance the communication signal.

In some embodiments of the present disclosure, in response to the real-time traffic corresponding to the target time point satisfying the preset condition, updating the signal emission parameter and the signal reception parameter at the target time point based on the real-time traffic and the environmental parameter and generating the movement instruction to control the movement of the mobile station can achieve flexible resource allocation aligned with actual demands, thereby balancing performance and power consumption.

In some embodiments, the adjustment module 180 is further configured to: at each of the plurality of target time points: determine an anti-jamming capability of a current operational mode through an anti-jamming prediction model based on a meteorological condition and a signal noise level; and in response to the anti-jamming capability of the current operational mode being below an anti-jamming threshold, determine an updated operational mode, an updated signal emission parameter, an updated signal reception parameter, and an updated movement instruction through an adjustment model.

The meteorological condition refers to a natural environmental parameter. In some embodiments, the meteorological condition may include sunny skies, heavy rains, lightning, or the like.

The signal noise level refers to an interference strength of a non-target signal in the target region. For example, the non-target signal may include clutter emitted by other devices, an electromagnetic pulse generated by lightning, or the like.

The anti-jamming threshold may be set manually or determined based on historical experience.

In some embodiments, the anti-jamming prediction model is a machine learning model. In some embodiments, the anti-jamming prediction model is a Convolutional Neural Network (CNN) model.

In some embodiments, an input to the anti-jamming prediction model may include the meteorological condition, the signal noise level, a current signal emission parameter, a current signal reception parameter, a current location of the mobile station, and the current operational mode, and an output of the anti-jamming prediction model is the anti-jamming capability of the current operational mode.

In some embodiments, the anti-jamming prediction model is obtained by training based on a second training sample dataset. The second training sample dataset includes second training samples and second training labels corresponding to the second training samples. In some embodiments, the second training sample may include a sample meteorological condition, a sample signal noise level, a sample current signal emission parameter, a sample current signal reception parameter, a sample current location of the mobile station, and a sample current operational mode. The second training label is the anti-jamming capability of the sample current operational mode corresponding to the second training sample.

In some embodiments, the anti-jamming prediction model is obtained by performing a plurality of rounds of iterative training in a manner similar to that of the temporal model, which will not be repeated herein.

In some embodiments, the second training samples and their corresponding second training labels may be obtained by collecting historical data. For example, the historical data includes a plurality of anti-jamming tests conducted during a historical time period, and the meteorological condition, the signal noise level, the signal emission parameter, the signal reception parameter, the location of the mobile station, and the operational mode at each anti-jamming test form the second training sample. For each second training label, a detection probability (Pd) and a false alarm rate (Pfa) of a test target (i.e., the target object under the anti-jamming test) are statistically analyzed, and the value of the second training label (i,e., the anti-jamming capability) is determined based on the detection probability (Pd) and the false alarm rate (Pfa). For example, if the Pd of a second training sample is high and the Pfa is low, it indicates that the anti-jamming capability is strong and the label value is high. Conversely, if the Pd is low or the Pfa is high, it indicates that the anti-jamming capability is weak and the label value is low.

In some embodiments, the adjustment model is a machine learning model. In some embodiments, the adjustment model is a Convolutional Neural Network (CNN) model.

In some embodiments, an input to the adjustment model may include the meteorological condition, the signal noise level, the current signal emission parameter, the current signal reception parameter, the current location of the mobile station, the current operational mode. An output of the adjustment model may include the updated operational mode, the updated signal emission parameter, the updated signal reception parameter, and the updated movement instruction.

In some embodiments, the adjustment model is obtained by training based on a third training sample dataset, the third training sample dataset including third training samples and third training labels corresponding to the corresponding. In some embodiments, the third training sample may include a sample meteorological condition, a sample signal noise level, a sample current signal emission parameter, a sample current signal reception parameter, a sample current location of the mobile station, and a sample current operational mode. The third training label is the updated operational mode, the updated signal emission parameter, the updated signal reception parameter, and the updated movement instruction corresponding to the sample third training.

In some embodiments, the adjustment model is obtained by performing a plurality of rounds of iterative training in a manner similar to that of the temporal model, which will not be repeated herein.

In some embodiments, the third training samples and their corresponding third training labels may be obtained by collecting historical data. For example, the historical data includes a plurality of adjustments performed over a historical time period. In determining the third training sample dataset, a plurality of preferred adjustments may be determined from the historical data, and a third training sample and the corresponding label may be generated based on each of the preferred adjustments. For example, the meteorological condition, the signal noise level, the signal emission parameter, the signal reception parameter, and the location of the mobile station during the preferred adjustments are designated as the third training sample. The updated operational mode, the updated signal emission parameter, the updated signal reception parameters, and the updated movement instruction corresponding to the preferred adjustment are designated as the corresponding third training label.

The preferred adjustment refers to an adjustment in the historical data where a adjusted anti-jamming capability is relatively high and a response time is less than a time threshold.

In some embodiments, in response to the anti-jamming capability corresponding to a preferred adjustment is lower than the anti-jamming threshold, additional third training label may be added. For example, the updated operational mode, the updated signal emission parameter, the updated signal reception parameter, and the updated movement instruction corresponding to a preferred anti-jamming prediction may be designated as an additional third training label.

The preferred anti-jamming prediction refers to an anti-jamming prediction in the historical data where the predicted anti-jamming capability is greater than an accuracy threshold, has a strongest anti-jamming capability after updating, and has a completion time that is below the time threshold. The completion time refers to a duration for the communication mobile station to move to a designated location and a duration required for modifying the signaling parameter (e.g., the signal emission parameter and the signal reception parameter) and sending the movement instruction, which are all relatively short.

In some embodiments of the present disclosure, by determining the anti-jamming capability of the current operational mode through the anti-jamming prediction model based on the meteorological condition and the signal noise level, and determining the updated operational mode, the updated signal emission parameter, the updated signal reception parameter, and the updated movement instruction through the adjustment model in response to the anti-jamming capability of the current operational mode being below the anti-jamming threshold, the system 100 can use different operational modes in different environments to reduce interference.

The method for multi-modal sensing and monitoring provided by embodiments of the present disclosure performs sensing in three operational modes for the communication base station, the communication relay station, and the communication mobile station. 3D information of the range, the velocity, and the angle of the target object is extracted respectively from the signal reflected by the target object. In addition, based on the deep learning network enhanced by the PointMultiply module and the spatial channel attention module, three classes of target objects, i.e., the aircraft class, the vehicle class, and the human class, are detected and classified simultaneously in three-dimensional space, thereby achieving the multi-modal monitoring with multi-base station modal cooperative sensing, multi-class target classification, and multi-dimensional spatial detection, and enhancing the accuracy and precision of the airport surface monitoring.

The method for multi-modal sensing and monitoring provided by embodiments of the present disclosure also configures the communication base station sensing mode, the communication relay station sensing mode, and the communication mobile station sensing mode to adapt to different monitoring needs and environmental conditions.

The method for multi-modal sensing and monitoring provided by embodiments of the present disclosure utilizes the high bandwidth and low-latency data transmission capabilities of advanced 5G AeroMACS technology, as well as a wide range of connectivity capabilities to connect a large number of sensors and devices. This enables the system for multi-modal sensing and monitoring to achieve extensive coverage and detailed monitoring of the airport surface, and ensure real-time and complete data transmission.

The method for multi-modal sensing and monitoring provided by embodiments of the present disclosure adopts multi-antenna reception technology and Doppler frequency shift technology for data acquisition, enabling precise capture of reception signals reflected by target objects. These signals are transmitted via 5G AeroMACS technology, ensuring fast and accurate delivery of data to the processing center.

The method for multi-modal sensing and monitoring provided by embodiments of the present disclosure employs a convolutional neural network based on a channel attention mechanism for information fusion of a multidimensional sensing spectrum. The method simultaneously determines the range, the velocity, and the angle of three classes of target objects including the aircraft class, the vehicle class, and the human class, to effectively extract the key features in the sensing data to achieve accurate identification and localization of the target objects. The deep learning model provided by the embodiments of the present disclosure employs a multi-task learning framework that integrates a plurality of related tasks to enhance the generalization ability and robustness of the model.

An application layer of the system for multi-modal perception and monitoring provided by embodiments of the present disclosure converts processed data into actual monitoring results and decision support information, and provides diversified and customized smart services for airport management, airlines, airports and other related parties. The system not only improves the accuracy and efficiency of monitoring, but also provides strong technical support for airport safety management, which has significant social and economic value.

Some embodiments of the present disclosure further provide a non-transitory computer-readable storage medium storing computer instructions. After reading the computer instructions stored in the storage medium, a computer executing the method for multi-modal sensing and monitoring described in the present disclosure.

It should be noted that the foregoing description of process 500 is intended to be exemplary and illustrative only and does not limit the scope of application of the present disclosure. For a person skilled in the art, various corrections and changes can be made to the process under the guidance of the present disclosure. However, these corrections and changes remain within the scope of the present disclosure.

The basic concepts are described above. Obviously, for those skilled in the art, the above detailed disclosure is only an example, and does not constitute a limitation to the present disclosure. Although not expressly stated here, those skilled in the art may make various modifications, improvements, and corrections to the present disclosure. Such modifications, improvements and corrections are suggested in present disclosure, so such modifications, improvements, and corrections still belong to the spirit and scope of the exemplary embodiments of the present disclosure.

Meanwhile, the present disclosure uses specific words to describe the embodiments of the present disclosure. For example, "one embodiment," "an embodiment," and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This manner of disclosure does not, however, imply that the subject matters of the disclosure requires more features than are recited in the claims. Rather, claimed subject matters may lie in less than all features of a single foregoing disclosed embodiment.

In some embodiments, counts describing the quantity of components and attributes are used. It should be understood that such counts used in the description of the embodiments use the modifiers "about," "approximately," or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that may vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A system for multi-modal sensing and monitoring, comprising:
   a signal emission node, including at least one of a communication base station and a communication relay station, configured to emit an emission signal to a target object;
   a signal reception node, including at least one of the communication base station, the communication relay station, and a communication mobile station, configured to receive a reception signal reflected by the target object;
   a mode switching module configured to select an operational mode for communication sensing based on a target region;

a generation module configured to generate a sensing spectrum based on a signal transmitted between the signal emission node, the signal receiving node, and the target object;

a detection module configured to determine a sensing and monitoring result of the target object based on the sensing spectrum, wherein the sensing and monitoring result includes at least one of a location, a confidence level, and a class of the target object; and an adjustment module configured to:
  at each of a plurality of target time points:
    determine a confidence drop value corresponding to the target time point based on an average confidence level corresponding to the target time point and an average confidence level corresponding to a previous target time point;
    in response to the confidence drop value corresponding to the target time point being greater than a preset threshold, update a signal emission parameter and a signal reception parameter at the target time point, generate a signal emission instruction and a signal reception instruction based on an updated signal emission parameter and an updated signal reception parameter, and send the signal emission instruction and the signal reception instruction to the signal emission node and the signal reception node, respectively, wherein the signal emission instruction controls the signal emission node to emit the emission signal, and the signal reception instruction controls the signal reception node to receive the reception signal; and
    generate a target location at the target time point, and generate a movement instruction based on the target location, the movement instruction controlling a movement of the communication mobile station.

2. The system of claim 1, further comprising:
a communication transmission module configured to transmit the sensing spectrum acquired at, at least one of the communication relay station and the communication mobile station to the communication base station.

3. The system of claim 1, wherein the detection module is further configured to:
determine a three-dimensional (3D) detection bounding box of the target object by performing information fusion on the sensing spectrum based on a first detection model;
determine a second detection model based on the 3D detection bounding box and a ground truth bounding box of the target object; and
determine the sensing and monitoring result based on the second detection model, wherein the second detection model is a convolutional neural network (CNN) model, and the acquisition of the second detection model includes:
  obtaining a loss between the 3D detection bounding box and the ground truth bounding box of the target object through a loss function, wherein the loss includes a class loss, a localization loss, and a confidence loss,
  obtaining a gradient of network parameters based on a backpropagation algorithm, and
  determining whether the second detection model achieves performance convergence based on a validation set;
  in response to determining that the performance convergence is achieved, obtaining a trained second detection model,
  in response to determining that the performance convergence is not achieved, adjusting initial weights or a learning rate during network training.

4. The system of claim 3, further comprising:
a network training module configured to construct the first detection model, the first detection model including a fusion detection network, a spatial channel attentional module, a shared multilayer perceptron, a spatial attention module, a generative spatial attention map, and an attention mechanism module.

5. The system of claim 1, wherein the adjustment module is further configured to:
update the signal emission parameter and the signal reception parameter based on the operational mode.

6. The system of claim 1, wherein to generate the target location at the target time point, the adjustment module is further configured to:
determine a predicted motion trajectory of the target object based on the sensing spectrum through a temporal model, the temporal model being a machine learning model; and
determine the target location based on the predicted motion trajectory.

7. The system of claim 6, wherein an output of the temporal model includes a potential collision risk.

8. The method of claim 6, wherein an input to the temporal model is a current sensing spectrum of the target object,
the output of the temporal model is the predicted motion trajectory of the target object, and
the temporal model is acquired by training based on a first training sample dataset, wherein the first training sample dataset includes first training samples and first training labels corresponding to the first training samples, one of the first training samples includes a sample sensing spectrum of the target object at a first time point, and one of the first training labels is a sample motion trajectory of the target object at a second time point, the second time point is after the first time point, the temporal model is trained by performing a plurality of rounds of iterations, and at least one round of iterations includes:
  selecting one or more first training samples from the first training sample dataset,
  inputting the one or more first training samples into an initial temporal model to obtain the future motion trajectory of the target object corresponding to the one or more first training samples,
  determining a loss function based on the future motion trajectory of the target object corresponding to the one or more first training samples and the labels of the one or more first training samples by substituting them into a formula for a preset loss function;
  updating parameters of the initial temporal model inversely by gradient descent based on the loss function; and
  in response to determining that a preset condition is satisfied, completing the training of the temporal model to obtain a trained temporal model.

9. The system of claim 1, wherein the adjustment module is further configured to:
at each of a plurality of target time points:
  in response to real-time traffic corresponding to the target time point satisfying a preset condition, update a signal emission parameter and a signal reception parameter at the target time point based on the real-time traffic and an environmental parameter, and generate a movement instruction to control a movement of the communication mobile station.

10. The system of claim 9, wherein the adjustment module is further configured to:
at each of the plurality of target time points:
determine an anti-jamming capability of a current operational mode through an anti-jamming prediction model based on a meteorological condition and a signal noise level, the anti-jamming prediction model being a machine learning model; and
in response to the anti-jamming capability of the current operational mode being below an anti-jamming threshold, determine an updated operational mode, an updated signal emission parameter, an updated signal reception parameter, and an updated movement instruction through an adjustment model, the adjustment model being a machine learning model.

11. The system of claim 1, wherein the operational mode includes at least one of a communication base station sensing mode, a communication relay station sensing mode, and a communication mobile station sensing mode;
in the communication base station sensing mode, the communication base station functions as the signal emission node and the signal reception node;
in the communication relay sensing mode, the communication base station functions as the signal emission node and the communication relay station functions as the signal reception node; and
in the communication mobile station sensing mode, the communication base station or the communication relay station functions as the signal emission node, and the communication mobile station functions as the signal reception node.

12. A method for multi-modal sensing and monitoring, comprising:
determining an operational mode in which a signal emission node and a signal reception node perform communication-based sensing on a target object;
obtaining at least one of an emission signal emitted from the signal emission node, a signal reception delay at the signal reception node, a Doppler frequency shift of a signal travelling round-trip between the signal emission node and the signal reception node, and a reception angle;
obtaining a reception signal at the signal reception node based on at least one of the emission signal, the signal reception delay, the Doppler frequency shift, and the reception angle;
obtaining a sensing spectrum based on the reception signal;
determining, based on the sensing spectrum, a sensing and monitoring result of the target object, wherein the sensing and monitoring result includes at least one of a location, a confidence level, and a class of the target object; and
at each of a plurality of target time points:
determining a confidence drop value corresponding to target time point based on an average confidence level corresponding to the target time point and an average confidence level corresponding to a previous target time point;
in response to the confidence drop value at the target time point being greater than a preset threshold, updating a signal emission parameter and a signal reception parameter at the target time point, generating a signal emission instruction and a signal reception instruction based on the updated signal emission parameter and the updated signal reception parameter, and sending the signal emission instruction and the signal reception instruction to the signal emission node and the signal reception node, respectively, wherein the signal emission instruction controls the signal emission node to emit the emission signal, and the signal reception instruction controls the signal reception node to receive the reception signal; and
generating a target location at the target time point, and generating a movement instruction based on the target location, the movement instruction controlling a movement of the communication mobile station.

13. The method of claim 12, wherein the signal emission node includes at least one of a communication base station and a communication relay station, the signal receiving node includes at least one of the communication base station, the communication relay station, and a communication mobile station, and the operational mode includes at least one of a communication base station sensing mode, a communication relay station sensing mode, and a communication mobile station sensing mode;
in the communication base station sensing mode, the communication base station functions as the signal emission node and the signal reception node;
in the communication relay sensing mode, the communication base station functions as the signal emission node and the communication relay station functions as the signal reception node; and
in the communication mobile station sensing mode, the communication base station or the communication relay station functions as the signal emission node, and the communication mobile station functions as the signal reception node.

14. The method of claim 12, wherein the determining, based on the sensing spectrum, a sensing and monitoring result of the target object, includes:
determining a three-dimensional (3D) detection bounding box of the target object by performing information fusion on the sensing spectrum based on a first detection model;
determining a second detection model based on the 3D detection bounding box and a ground truth bounding box of the target object, wherein the second detection model is a convolutional neural network (CNN) model, and the acquisition of the second detection model includes: obtaining a loss between the 3D detection bounding box and the ground truth bounding box of the target object through a loss function, wherein
the loss includes a class loss, a localization loss, and a confidence loss, obtaining a gradient of network parameters based on a backpropagation algorithm, and
determining whether the second detection model achieves performance convergence based on a validation set;
in response to determining that the performance convergence is achieved, obtaining a trained second detection model,
in response to determining that the performance convergence is not achieved, adjusting initial weights or a learning rate during network training; and determining the sensing and monitoring result based on the second detection model.

15. The method of claim 12, wherein the updating a signal emission parameter and a signal reception parameter at the target time point includes:
updating the signal emission parameter and the signal reception parameter based on the operational mode.

16. The method of claim 12, wherein the generating the target location at the target time point includes:
determining a predicted motion trajectory of the target object based on the sensing spectrum through a temporal model, the temporal model being a machine learning model; and
determining the target location based on the predicted motion trajectory.

17. The method of claim 16, wherein an input to the temporal model is a current sensing spectrum of the target object,
an output of the temporal model is the predicted motion trajectory of the target object, and
the temporal model is acquired by training based on a first training sample dataset, wherein the first training sample dataset includes first training samples and first training labels corresponding to the first training samples, one of the first training samples includes a sample sensing spectrum of the target object at a first time point, and one of the first training labels is a sample motion trajectory of the target object at a second time point, the second time point is after the first time point, the temporal model is trained by performing a plurality of rounds of iterations, and at least one round of iterations includes:
selecting one or more first training samples from the first training sample dataset,
inputting the one or more first training samples into an initial temporal model to obtain the future motion trajectory of the target object corresponding to the one or more first training samples,
determining a loss function based on the future motion trajectory of the target object corresponding to the one or more first training samples and the labels of the one or more first training samples by substituting them into a formula for a preset loss function;
updating parameters of the initial temporal model inversely by gradient descent based on the loss function; and
in response to determining that a preset condition is satisfied, completing the training of the temporal model to obtain a trained temporal model.

18. The method of claim 12, further comprising:
at the each of a plurality of target time points:
in response to real-time traffic corresponding to the target time point satisfying a preset condition, updating a signal emission parameter and a signal reception parameter at the target time point based on the real-time traffic and an environmental parameter, and generating a movement instruction to control a movement of the communication mobile station.

19. The method of claim 18, further comprising:
at each of the plurality of target time points:
determining an anti-jamming capability of a current operational mode through an anti-jamming prediction model based on a meteorological condition and a signal noise level, the anti-jamming prediction model being a machine learning model;
in response to the anti-jamming capability of the current operational mode being below an anti-jamming threshold, determining an updated operational mode, an updated signal emission parameter, an updated signal reception parameter, and an updated movement instruction through an adjustment model, the adjustment model being a machine learning model.

20. A non-transitory computer-readable storage medium, wherein the storage medium stores computer instructions, and when a computer reads the computer instructions in the storage medium, the computer executes a method for multi-modal sensing and monitoring, the method comprising:
determining an operational mode in which a signal emission node and a signal reception node perform communication-based sensing on a target object;
obtaining at least one of an emission signal emitted from the signal emission node, a signal reception delay at the signal reception node, a Doppler frequency shift, and a reception angle at which the signal makes a round trip between the signal emission node and the signal reception node;
obtaining a reception signal at the signal reception node based on at least one of the emission signal, the signal reception delay, the Doppler frequency shift, and the reception angle;
obtaining a sensing spectrum based on the reception signal; and
determining, based on the sensing spectrum, a sensing and monitoring result of the target object, wherein the sensing and monitoring result includes at least one of a location, a confidence level, and a class of the target object; and
at each of a plurality of target time points:
determining a confidence drop value corresponding to target time point based on an average confidence level corresponding to the target time point and an average confidence level corresponding to a previous target time point;
in response to the confidence drop value at the target time point being greater than a preset threshold, updating a signal emission parameter and a signal reception parameter at the target time point, generating a signal emission instruction and a signal reception instruction based on the updated signal emission parameter and the updated signal reception parameter, and sending the signal emission instruction and the signal reception instruction to the signal emission node and the signal reception node, respectively, wherein the signal emission instruction controls the signal emission node to emit the emission signal, and the signal reception instruction controls the signal reception node to receive the reception signal; and
generating a target location at the target time point, and generating a movement instruction based on the target location, the movement instruction controlling a movement of the communication mobile station.

* * * * *